US012755386B2

(12) United States Patent
Borse et al.

(10) Patent No.: US 12,755,386 B2
(45) Date of Patent: Oct. 6, 2026

(54) DYNAMIC DELTA TRANSFORMATIONS FOR SEGMENTATION

(71) Applicant: QUALCOMM Incorporated, San Diego, CA (US)

(72) Inventors: Shubhankar Mangesh Borse, San Diego, CA (US); Hyojin Park, San Diego, CA (US); Risheek Garrepalli, San Diego, CA (US); Debasmit Das, San Diego, CA (US); Hong Cai, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 430 days.

(21) Appl. No.: 18/346,470

(22) Filed: Jul. 3, 2023

(65) Prior Publication Data

US 2024/0169542 A1 May 23, 2024

Related U.S. Application Data

(60) Provisional application No. 63/384,748, filed on Nov. 22, 2022.

(51) Int. Cl.
*G06T 7/10* (2017.01)
*G06T 5/20* (2006.01)
(Continued)

(52) U.S. Cl.
CPC .................. *G06T 7/10* (2017.01); *G06T 5/20* (2013.01); *G06T 5/50* (2013.01); *G06V 10/44* (2022.01);
(Continued)

(58) Field of Classification Search
CPC .................... G06V 10/806; G06V 10/44–457; G06T 5/20; G06T 5/50; G06T 2207/20221
See application file for complete search history.

(56) References Cited

U.S. PATENT DOCUMENTS

| | | | | |
|---|---|---|---|---|
| 2020/0084427 A1* | 3/2020 | Sun | ........................ | G06N 3/045 |
| 2020/0099448 A1* | 3/2020 | Nicholes | ................ | G06T 7/254 |

(Continued)

FOREIGN PATENT DOCUMENTS

CN 114549535 A 5/2022

OTHER PUBLICATIONS

Ding M., et al., "Every Frame Counts: Joint Learning of Video Segmentation and Optical Flow", arXiv:1911.12739v1 [cs.CV], Proceedings of the AAAI Conference on Artificial Intelligence, vol. 34, No. 07, Nov. 28, 2019, 8 Pages, XP093126604, Section: Framework Overview, Par. 2 and 3.

(Continued)

*Primary Examiner* — Sean T Motsinger
(74) *Attorney, Agent, or Firm* — Polsinelli LLP

(57) ABSTRACT

Techniques and systems are provided for generating one or more segmentations masks. For instance, a process may include generating a delta image based on a difference between a current image and a prior image. The process may further include processing, using a transform operation, the delta image and features representing the prior image to generate a transformed feature representation of the prior image. The process may include combining the transformed feature representation of the prior image with features representing the current image to generate a combined feature representation of the current image. The process may further include generating, based on the combined feature representation of the current image, a segmentation mask for the current image.

30 Claims, 17 Drawing Sheets

(51) Int. Cl.

| | |
|---|---|
| ***G06T 5/50*** | (2006.01) |
| ***G06V 10/44*** | (2022.01) |
| ***G06V 10/80*** | (2022.01) |

(52) U.S. Cl.

CPC .. *G06V 10/806* (2022.01); *G06T 2207/20221* (2013.01)

(56) References Cited

U.S. PATENT DOCUMENTS

| | | | | |
|---|---|---|---|---|
| 2021/0326638 | A1* | 10/2021 | Lee | G06V 20/46 |
| 2022/0021870 | A1* | 1/2022 | Jiang | H04N 19/90 |
| 2022/0058452 | A1* | 2/2022 | Zhang | G06T 1/0007 |
| 2022/0148284 | A1* | 5/2022 | Kim | G06V 10/24 |
| 2022/0301311 | A1* | 9/2022 | Abati | G06T 3/40 |
| 2023/0118401 | A1* | 4/2023 | Xu | G06T 7/162 382/103 |
| 2023/0147843 | A1* | 5/2023 | Iyer | G06V 10/776 382/229 |
| 2024/0161238 | A1* | 5/2024 | Lee | G06N 3/0464 |
| 2024/0169542 | A1* | 5/2024 | Borse | G06T 7/10 |
| 2024/0273852 | A1* | 8/2024 | Dong | G06V 10/761 |
| 2025/0259283 | A1* | 8/2025 | Ravi Kumar | G06V 20/647 |

OTHER PUBLICATIONS

International Search Report and Written Opinion—PCT/US2023/075368—ISA/EPO—Feb. 16, 2024.

Li J., et al., "Video Semantic Segmentation via Sparse Temporal Transformer", Proceedings of the 29th ACM International Conference on Multimedia, Oct. 20, 2021, pp. 59-68, XP093128131, Abstract.

Nilsson D., et al., "Semantic Video Segmentation by Gated Recurrent Flow Propagation", 2018 IEEE/CVF Conference on Computer Vision and Pattern Recognition, IEEE, Jun. 18, 2018, pp. 6819-6828, XP033473600, figure 1.

* cited by examiner

DYNAMIC DELTA TRANSFORMATIONS FOR SEGMENTATION

CROSS-REFERENCE TO RELATED APPLICATIONS

This application claims the benefit of U.S. Provisional Application 63/384,748, filed Nov. 22, 2022, which is hereby incorporated by reference, in its entirety and for all purposes.

FIELD

The present disclosure generally relates to processing image data to perform segmentation (e.g., semantic segmentation, instance segmentation, etc.). For example, aspects of the present disclosure including systems and techniques for performing segmentation using delta or different images (e.g., based on a difference between an input image for a current time frame and an input image for a previous time frame).

BACKGROUND

Increasingly, devices or systems (e.g., autonomous vehicles, such as autonomous and semi-autonomous vehicles, drones or unmanned aerial vehicles (UAVs), mobile robots, mobile devices such as mobile phones, extended reality (XR) devices, and other suitable devices or systems) include multiple sensors to gather information about an environment, as well as processing systems to process the information for various purposes, such as for route planning, navigation, collision avoidance, etc. One example of such a system is an Advanced Driver Assistance System (ADAS) for an autonomous or semi-autonomous vehicle.

The devices or systems can perform segmentation on the sensor data (e.g., one or more images) to generate a segmentation output (e.g., a segmentation mask or map). Based on the segmentation, objects may be identified and labeled with a corresponding classification of particular objects (e.g., humans, cars, background, etc.) within an image or video. The labeling may be performed on a per pixel basis. A segmentation mask may be a representation of the labels of the image or view. The segmentation output can then be used to perform one or more operations, such as image processing (e.g., blurring a portion of the image). Consistency in the segmentation output over time (referred to as temporal consistency) can be difficult to maintain, resulting in visual deficiencies in an output.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

According to at least one example, a processor-implemented method is provided. The method includes: generating a delta image based on a difference between a current image and a prior image; processing, using a transform operation, the delta image and features representing the prior image to generate a transformed feature representation of the prior image; combining the transformed feature representation of the prior image with features representing the current image to generate a combined feature representation of the current image; and generating, based on the combined feature representation of the current image, a segmentation mask for the current image.

In another example, an apparatus is provided that includes: at least one memory; and at least one processor coupled to the at least one memory and configured to: generate a delta image based on a difference between a current image and a prior image; process, using a transform operation, the delta image and features representing the prior image to generate a transformed feature representation of the prior image; combine the transformed feature representation of the prior image with features representing the current image to generate a combined feature representation of the current image; and generate, based on the combined feature representation of the current image, a segmentation mask for the current image.

In another example, a non-transitory computer-readable medium is provided that has stored thereon instructions that, when executed by one or more processors, cause the one or more processors to: generate a delta image based on a difference between a current image and a prior image; process, using a transform operation, the delta image and features representing the prior image to generate a transformed feature representation of the prior image; combine the transformed feature representation of the prior image with features representing the current image to generate a combined feature representation of the current image; and generate, based on the combined feature representation of the current image, a segmentation mask for the current image.

In another example, an apparatus is provided that includes: means for generating a delta image based on a difference between a current image and a prior image; means for processing, using a transform operation, the delta image and features representing the prior image to generate a transformed feature representation of the prior image; means for combining the transformed feature representation of the prior image with features representing the current image to generate a combined feature representation of the current image; and means for generating, based on the combined feature representation of the current image, a segmentation mask for the current image.

In some aspects, the apparatus is, is part of, and/or includes a vehicle or a computing device or component of a vehicle (e.g., an autonomous vehicle), a mobile device (e.g., a mobile telephone or so-called "smart phone" or other mobile device), an extended reality (XR) device (e.g., a virtual reality (VR) device, an augmented reality (AR) device, or a mixed reality (MR) device), a camera, a wearable device (e.g., a network-connected watch, etc.), a personal computer, a laptop computer, a server computer, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1A:
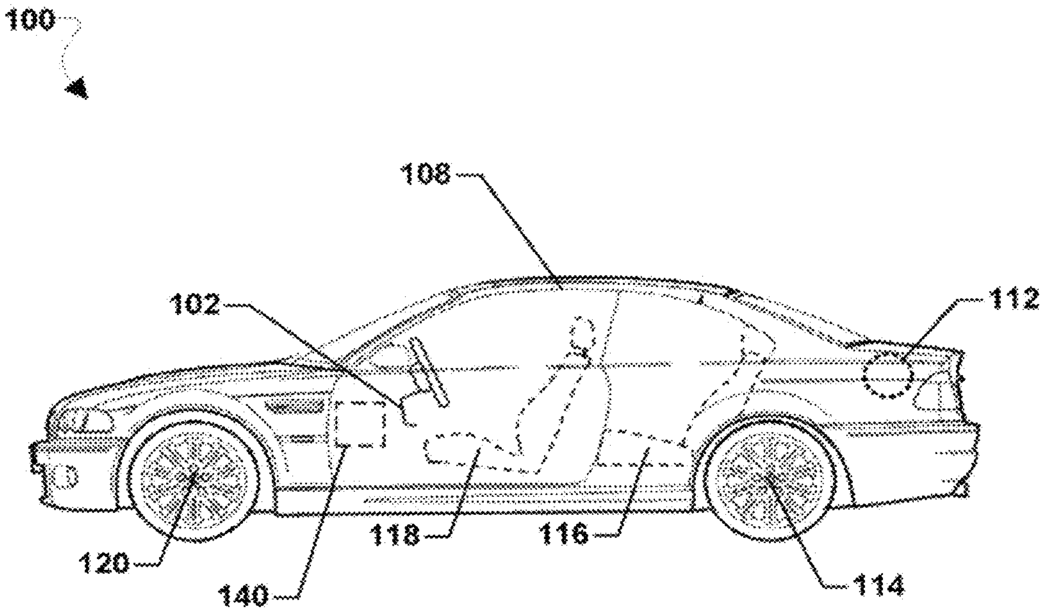
FIGS. 1A and 1B are block diagrams illustrating a vehicle suitable for implementing various aspects, in accordance with aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

In some cases, an image or video frame may be processed to identify one or more objects present within the image or video frame, such as prior to performing one or more operations on the image or video (e.g., autonomous or semi-autonomous driving operations, applying effects to an image, etc.). For example, adding a virtual background to a video conference may include identifying objects (e.g., persons) in the foreground and modifying all portions of the video frames other than the pixels that below to the objects. In some cases, objects in an image may be identified by using one or more neural networks or other machine learning (ML) models to assign segmentation classes (e.g., person, class, car class, background class, etc.) to each pixel in a frame and then grouping contiguous pixels sharing a segmentation class to form an object of the segmentation class (e.g., a person, car, background, etc.). This technique may be referred to as pixel-wise segmentation. The pixel-wise labels may be referred to as a segmentation mask (also referred to herein as a segmentation map).

One example of a type of segmentation is semantic segmentation, which treats multiple objects of the same class as a single entity or instance (e.g., all detected people within an image are treated as a "person" class). Another type of segmentation is instance segmentation, which considers multiple objects of the same class as distinct entities or instances (e.g., a first person detected in an image is a first instance of a "person" class and a second person detected in an image is a second instance of the "person" class).

In some cases, pixel-wise segmentation may include inputting an image into an ML model, such as (but not limited to) a convolutional neural network (CNN). The ML model may process the image to output a segmentation mask or map for the image. The segmentation mask may include segmentation class information for each pixel in the frame. In some cases, the segmentation mask may be configured to keep information only for pixels corresponding to one or more classes (e.g., for pixels classified as a person), isolating the selected classified pixels from other classified pixels (e.g., isolating person pixels from background pixels).

Segmentation can be important for different devices or applications, including a one or more cameras of a mobile device, a vehicle, an extended reality (XR) device, an internet-of-things (IoT) device, among others. Current segmentation solutions (e.g., that are deployed on device) may face an issue of inconsistent semantic or instance representations based on different camera settings (e.g., image signal process (ISP) settings) and inconsistent semantic or instance representations over time (referred to as temporal inconsistencies). For instance, current ML systems that generate segmentation masks may produce segmentation masks with flickering artifacts due to inconsistent predictions between images or frames.

Systems, apparatuses, electronic devices, methods (also referred to as processes), and computer-readable media (collectively referred to herein as "systems and techniques") are described herein that provide a machine learning system that utilizes delta images to generate segmentation masks for images. For example, a transform operation of the machine learning system may use the delta image to transform a prior image so that the prior image is pixel-aligned with a current image (e.g., an object in the prior image is represented with a pose that is similar to a pose of the object in the current image). In some examples, a computing device can generate the delta image based on a difference between a current image and a prior image. The computing device can process the delta image and features representing the prior image using the transform operation (e.g., a convolutional operation performed using at least one convolutional filter, a transformer operation performed using at least one transformer block, or other transform operation) of the machine learning system to generate a transformed feature representation of the prior image. The computing device can combine the transformed feature representation of the prior image with features representing the current image to generate a combined feature representation of the current image. The computing device can then generate a segmentation mask for the current image based on the combined feature representation of the current image.

Various aspects of the application will be described with respect to the figures.

The systems and techniques described herein may be implemented by any type of system or device. One illustrative example of a system that can be used to implement the systems and techniques described herein is a vehicle (e.g., an autonomous or semi-autonomous vehicle) or a system or component (e.g., an ADAS or other system or component) of the vehicle. Other examples of systems or devices that can be used to perform the techniques described herein may include mobile devices (e.g., a mobile telephone or so-called "smart phone" or other mobile device), XR devices (e.g., a VR device, an AR device, an MR device, etc.), cameras, wearable devices (e.g., a network-connected watch, etc.), and/or other type of systems or devices.

Figure 1B:
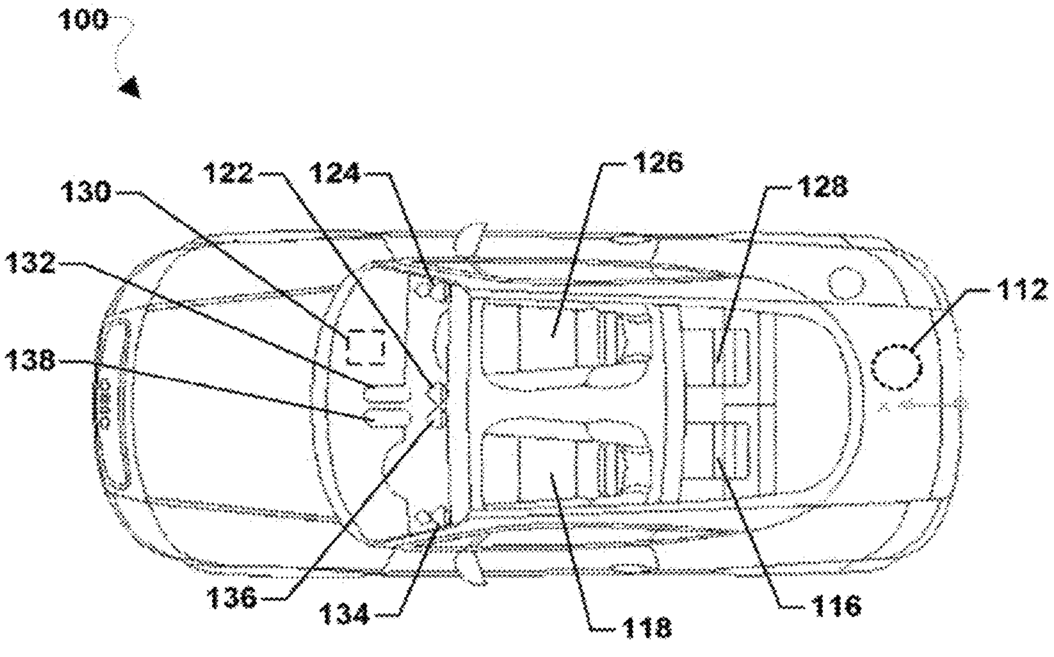

FIGS. 1A and 1B are diagrams illustrating an example vehicle 100 that may implement the systems and techniques described herein. With reference to FIGS. 1A and 1B, a vehicle 100 may include a control unit 140 and a plurality of sensors 102-138, including satellite geopositioning system receivers (e.g., sensors) 108, occupancy sensors 112, 116, 118, 126, 128, tire pressure sensors 114, 120, a camera 122, a camera 136, microphones 124, 134, impact sensors 130, radar 132, and light detection and ranging (LIDAR) 138. The plurality of sensors 102-138, disposed in or on the vehicle, may be used for various purposes, such as autonomous and semi-autonomous navigation and control, crash avoidance, position determination, etc., as well to provide sensor data regarding objects and people in or on the vehicle 100. The sensors 102-138 may include one or more of a wide variety of sensors capable of detecting a variety of information useful for navigation and collision avoidance. Each of the sensors 102-138 may be in wired or wireless communication with a control unit 140, as well as with each other. In particular, the sensors may include one or more cameras 122, 136 or other optical sensors or photo optic sensors. The sensors may further include other types of object detection and ranging sensors, such as radar 132, LIDAR 138, IR sensors, and ultrasonic sensors. The sensors may further include tire pressure sensors 114, 120, humidity sensors, temperature sensors, satellite geopositioning sensors 108, accelerometers, vibration sensors, gyroscopes, gravimeters, impact sensors 130, force meters, stress meters, strain sensors, fluid sensors, chemical sensors, gas content analyzers, pH sensors, radiation sensors, Geiger counters, neutron detectors, biological material sensors, microphones 124, 134, occupancy sensors 112, 116, 118, 126, 128, proximity sensors, and other sensors.

The vehicle control unit 140 may be configured with processor-executable instructions to perform various aspects using information received from various sensors, particularly the camera 122, the camera 136, the radar 132, and the LIDAR 138. In some aspects, the control unit 140 may supplement the processing of camera images using distance and relative position information (e.g., relative bearing angle) that may be obtained from the radar 132 and/or LIDAR 138 sensors. The control unit 140 may further be configured to control steering, breaking and speed of the vehicle 100 when operating in an autonomous or semi-autonomous mode using information regarding other vehicles determined using various aspects.

Figure 1C:
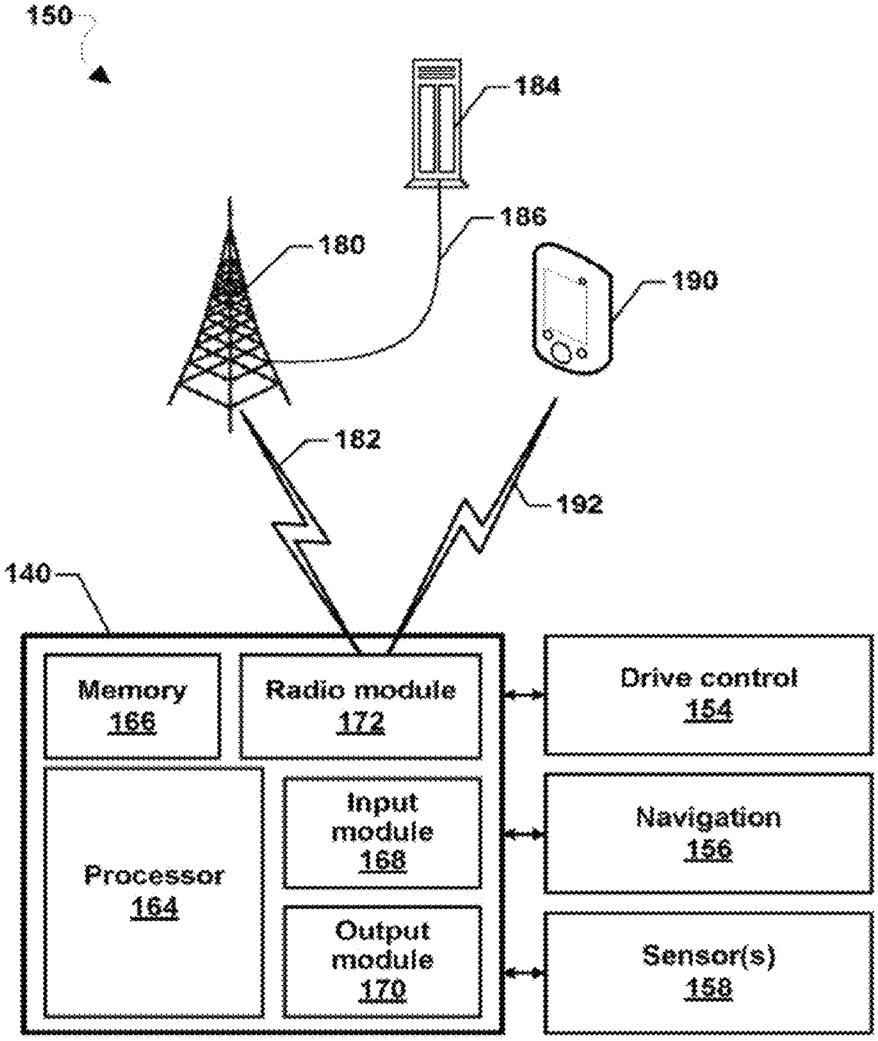
FIG. 1C is a block diagram illustrating components of a vehicle suitable for implementing various aspects, in accordance with aspects of the present disclosure.

FIG. 1C is a component block diagram illustrating a system 150 of components and support systems suitable for implementing various aspects. With reference to FIGS. 1A, 1B, and 1C, a vehicle 100 may include a control unit 140, which may include various circuits and devices used to control the operation of the vehicle 100. In the example illustrated in FIG. 1C, the control unit 140 includes a processor 164, memory 166, an input module 168, an output module 170, and a radio module 172. The control unit 140 may be coupled to and configured to control drive control components 154, navigation components 156, and one or more sensors 158 of the vehicle 100.

The control unit 140 may include a processor 164 that may be configured with processor-executable instructions to control maneuvering, navigation, and/or other operations of the vehicle 100, including operations of various aspects. The processor 164 may be coupled to the memory 166. The control unit 140 may include the input module 168, the output module 170, and the radio module 172.

The radio module 172 may be configured for wireless communication. The radio module 172 may exchange signals 182 (e.g., command signals for controlling maneuvering, signals from navigation facilities, etc.) with a network node 180, and may provide the signals 182 to the processor 164 and/or the navigation components 156. In some aspects, the radio module 172 may enable the vehicle 100 to communicate with a wireless communication device 190 through a wireless communication link 92. The wireless communication link 92 may be a bidirectional or unidirectional communication link and may use one or more communication protocols.

The input module 168 may receive sensor data from one or more vehicle sensors 158 as well as electronic signals from other components, including the drive control components 154 and the navigation components 156. The output module 170 may be used to communicate with or activate various components of the vehicle 100, including the drive control components 154, the navigation components 156, and the sensor(s) 158.

The control unit 140 may be coupled to the drive control components 154 to control physical elements of the vehicle 100 related to maneuvering and navigation of the vehicle, such as the engine, motors, throttles, steering elements, other control elements, braking or deceleration elements, and the like. The drive control components 154 may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 140 may be coupled to the navigation components 156 and may receive data from the navigation components 156. The control unit 140 may be configured to use such data to determine the present position and orientation of the vehicle 100, as well as an appropriate course toward a destination. In various aspects, the navigation components 156 may include or be coupled to a global navigation satellite system (GNSS) receiver system (e.g., one or more Global Positioning System (GPS) receivers) enabling the vehicle 100 to determine its current position using GNSS signals. Alternatively, or in addition, the navigation components 156 may include radio navigation receivers for receiving navigation beacons or other signals from radio nodes, such as Wi-Fi access points, cellular network sites, radio station, remote computing devices, other vehicles, etc. Through control of the drive control components 154, the processor 164 may control the vehicle 100 to navigate and maneuver. The processor 164 and/or the navigation components 156 may be configured to communicate with a server 184 on a network 186 (e.g., the Internet) using wireless signals 182 exchanged over a cellular data network via network node 180 to receive commands to control maneuvering, receive data useful in navigation, provide real-time position reports, and assess other data.

The control unit 140 may be coupled to one or more sensors 158. The sensor(s) 158 may include the sensors 102-138 as described, and may the configured to provide a variety of data to the processor 164.

While the control unit 140 is described as including separate components, in some aspects some or all of the components (e.g., the processor 164, the memory 166, the input module 168, the output module 170, and the radio module 172) may be integrated in a single device or module, such as a system-on-chip (SOC) processing device. Such an SOC processing device may be configured for use in vehicles and be configured, such as with processor-executable instructions executing in the processor 164, to perform operations of various aspects when installed into a vehicle.

Figure 1D:
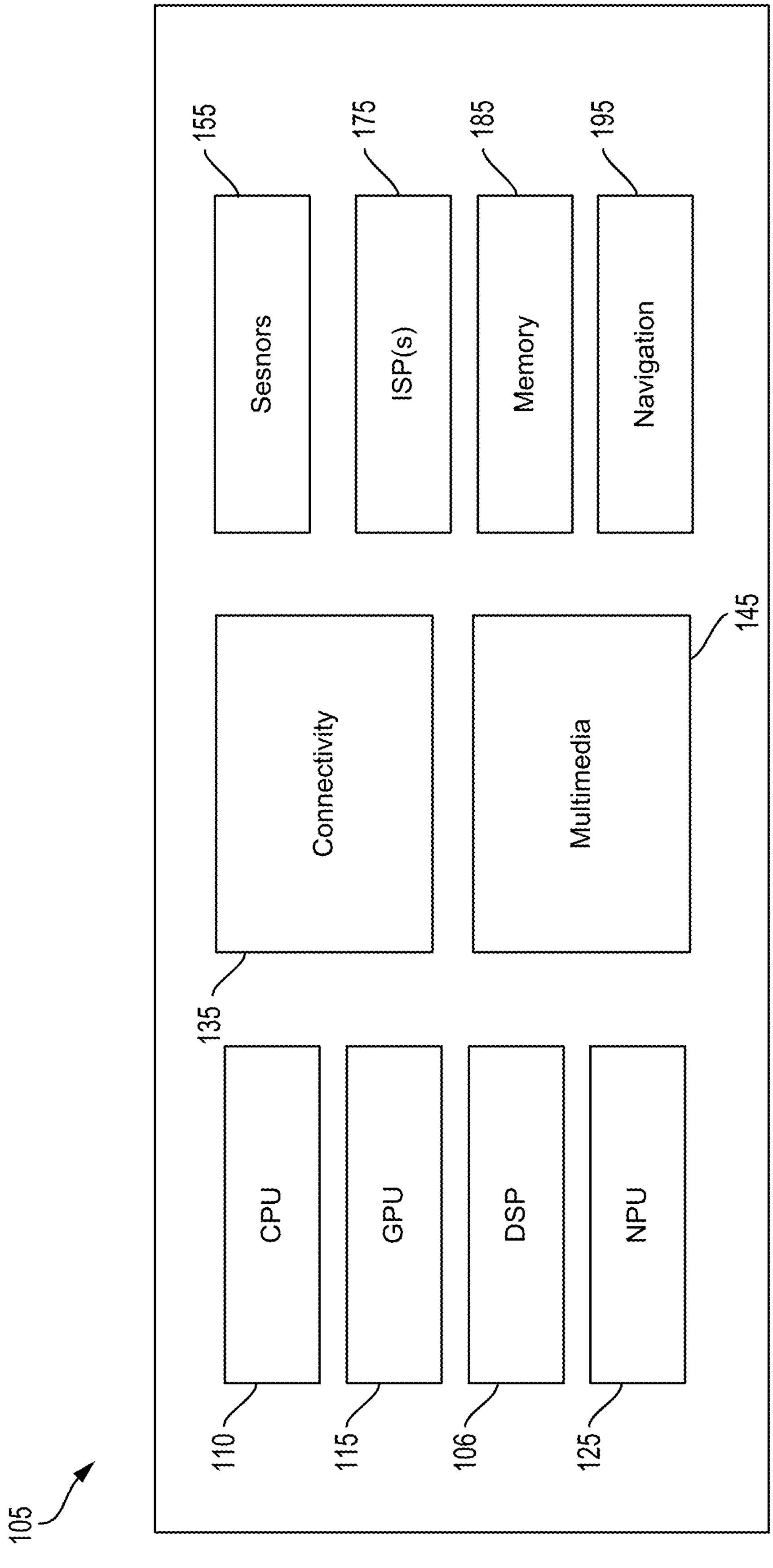
FIG. 1D illustrates an example implementation of a system-on-a-chip (SOC), in accordance with some examples.

FIG. 1D illustrates an example implementation of a system-on-a-chip (SOC) 105. The SOC 105 may include a central processing unit (CPU) 110 or a multi-core CPU, configured to perform one or more of the functions described herein. In some aspects, the SOC 105 may be based on an ARM instruction set. In some cases, the CPU 110 may be similar to the processor 164 of FIG. 1C. Parameters or variables (e.g., neural signals and synaptic weights), system parameters associated with a computational device (e.g., neural network with weights), delays, frequency bin information, task information, among other information may be stored in a memory block associated with a neural processing unit (NPU) 125, in a memory block associated with the CPU 110, in a memory block associated with a graphics processing unit (GPU) 115, in a memory block associated with a digital signal processor (DSP) 106, in a memory block 185, and/or may be distributed across multiple blocks. Instructions executed at the CPU 110 may be loaded from a program memory associated with the CPU 110 or may be loaded from the memory block 185.

The SOC 105 may also include additional processing blocks tailored to specific functions, such as the GPU 115, the DSP 106, the NPU 125, a connectivity block 135, and a multimedia processor 145. In some cases, the connectivity block 135 may include fifth generation new radio (5G NR) connectivity, fourth generation long term evolution (4G LTE) connectivity, Wi-Fi™ connectivity, universal serial bus (USB) connectivity, Bluetooth™ connectivity, and the like. In some examples, the multimedia processor 145 may, for example, detect and recognize gestures or perform other functions, such as generate segmentation masks according to systems and techniques described herein. In some aspects, the NPU 125 is implemented in the CPU 110, DSP 106, and/or GPU 115. The SOC 105 may also include a sensor processor 155, one or more image signal processors (ISPs) 175, and/or navigation module 195. In some cases, the navigation module 195 may include a global positioning system (GPS) or a global navigation satellite system (GNSS). In some cases, the navigation module 195 may be similar to navigation components 156 of FIG. 1C. In some examples, the sensor processor 155 may accept input from, for example, one or more sensors 158. In some cases, the connectivity block 135 may be similar to the radio module 172 of FIG. 1C.

Figure 2A:
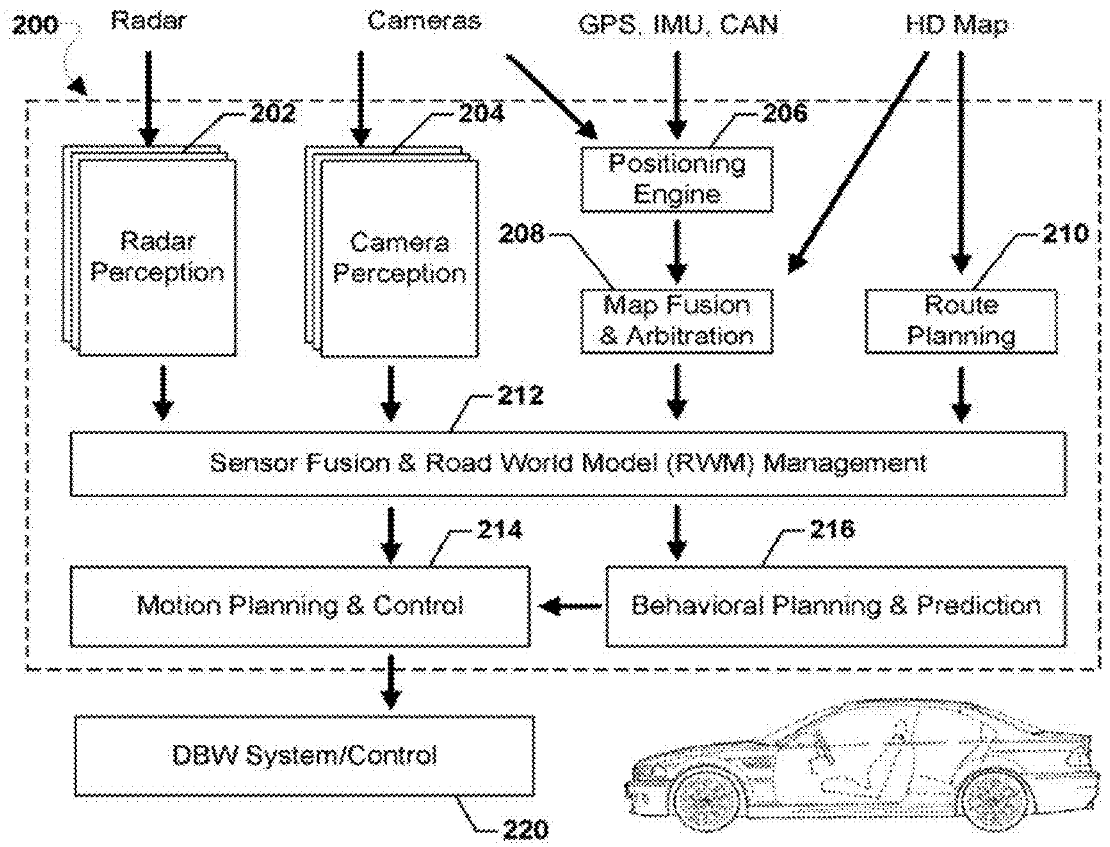
FIG. 2A is a component block diagram illustrating components of an example vehicle management system according to various aspects.

FIG. 2A illustrates an example of vehicle applications, subsystems, computational elements, or units within a vehicle management system 200, which may be utilized within a vehicle, such as vehicle 100 of FIG. 1A. With reference to FIGS. 1A-2A, in some aspects, the various vehicle applications, computational elements, or units within vehicle management system 200 may be implemented within a system of interconnected computing devices (e.g., subsystems), that communicate data and commands to each other. In other aspects, the vehicle management system 200 may be implemented as a plurality of vehicle applications executing within a single computing device, such as separate threads, processes, algorithms or computational elements. However, the use of the term vehicle applications in describing various aspects are not intended to imply or require that the corresponding functionality is implemented within a single autonomous (or semi-autonomous) vehicle management system computing device, although that is a potential implementation aspect. Rather the use of the term vehicle applications is intended to encompass subsystems with independent processors, computational elements (e.g., threads, algorithms, subroutines, etc.) running in one or more computing devices, and combinations of subsystems and computational elements.

In various aspects, the vehicle applications executing in a vehicle management system 200 may include (but are not limited to) a radar perception vehicle application 202, a camera perception vehicle application 204, a positioning engine vehicle application 206, a map fusion and arbitration vehicle application 208, a route vehicle planning application 210, sensor fusion and road world model (RWM) management vehicle application 212, motion planning and control vehicle application 214, and behavioral planning and prediction vehicle application 216. The vehicle applications 202-216 are merely examples of some vehicle applications in an example configuration of the vehicle management system 200. In other configurations consistent with various aspects, other vehicle applications may be included, such as additional vehicle applications for other perception sensors (e.g., LIDAR perception layer, etc.), additional vehicle applications for planning and/or control, additional vehicle applications for modeling, etc., and/or certain of the vehicle applications 202-216 may be excluded from the vehicle management system 200. Each of the vehicle applications 202-216 may exchange data, computational results and commands.

The vehicle management system 200 may receive and process data from sensors (e.g., radar, LIDAR, cameras, inertial measurement units (IMU) etc.), navigation systems (e.g., GPS receivers, IMUs, etc.), vehicle networks (e.g., a Controller Area Network (CAN) bus), and databases in memory (e.g., digital map data). The vehicle management system 200 may output vehicle control commands or signals to a drive by wire (DBW) system/control unit 220. The DBW system/control unit 220 is a system, subsystem or computing device that interfaces directly with vehicle steering, throttle and brake controls. The configuration of the vehicle management system 200 and the DBW system/control unit 220 illustrated in FIG. 2A is merely an example configuration and other configurations of a vehicle management system and other vehicle components may be used in the various aspects. In some examples, the configuration of the vehicle management system 200 and the DBW system/control unit 220 illustrated in FIG. 2A may be used in a vehicle configured for autonomous or semi-autonomous operation while a different configuration may be used in a non-autonomous vehicle.

The radar perception vehicle application 202 may receive data from one or more detection and ranging sensors, such as radar (e.g., radar 132) and/or LIDAR (e.g., LIDAR 138), and process the data to recognize and determine locations of other vehicles and objects within a vicinity of the vehicle 100. The radar perception vehicle application 202 may include use of neural network processing and artificial intelligence methods to recognize objects and vehicles, and pass such information on to the sensor fusion and RWM management vehicle application 212.

The camera perception vehicle application 204 may receive data from one or more cameras, such as cameras (e.g., the cameras 122, 136), and process the data to recognize and determine locations of other vehicles and objects within a vicinity of the vehicle 100. The camera perception vehicle application 204 may include use of neural network processing and artificial intelligence methods to recognize objects and vehicles. The camera perception vehicle application 204 may pass such information on to the sensor fusion and RWM management vehicle application 212.

The positioning engine vehicle application 206 may receive data from various sensors and process the data to determine a position of a vehicle (e.g., the vehicle 100). The various sensors may include, but are not limited to, a GPS sensor, an IMU, and/or other sensors connected via a bus (e.g., a CAN bus). The positioning engine vehicle application 206 may also utilize inputs from one or more cameras, such as cameras (e.g., the cameras 122, 136) and/or any other available sensor, such as radars, LIDARs, etc.

The map fusion and arbitration vehicle application 208 may access data within a high-definition (HD) map database and receive output received from the positioning engine vehicle application 206 and process the data to further determine the position of the vehicle 100 within the map, such as location within a lane of traffic, position within a street map, etc. The HD map database may be stored in a memory (e.g., the memory 166). For example, the map fusion and arbitration vehicle application 208 may convert latitude and longitude information from GPS into locations within a surface map of roads contained in the HD map database. GPS position fixes include errors, so the map fusion and arbitration vehicle application 208 may function to determine a best guess location of the vehicle 100 within a roadway based upon an arbitration between the GPS coordinates and the HD map data. For example, while GPS coordinates may place the vehicle 100 near the middle of a two-lane road in the HD map, the map fusion and arbitration vehicle application 208 may determine from the direction of travel that the vehicle 100 is most likely aligned with the travel lane consistent with the direction of travel. The map fusion and arbitration vehicle application 208 may pass map-based location information to the sensor fusion and RWM management vehicle application 212.

The route planning vehicle application 210 may utilize the HD map, as well as inputs from an operator or dispatcher to plan a route to be followed by the vehicle 100 to a particular destination. The route planning vehicle application 210 may pass map-based location information to the sensor fusion and RWM management vehicle application 212. However, the use of a prior map by other vehicle applications, such as the sensor fusion and RWM management vehicle application 212, etc., is not required. For example, other stacks may operate and/or control the vehicle based on perceptual data alone without a provided map, constructing lanes, boundaries, and the notion of a local map as perceptual data is received.

The sensor fusion and RWM management vehicle application 212 may receive data and outputs produced by one or more of the radar perception vehicle application 202, the camera perception vehicle application 204, the map fusion and arbitration vehicle application 208, and the route planning vehicle application 210. The sensor fusion and RWM management vehicle application 212 may use some or all of such inputs to estimate or refine a location and state of the vehicle 100 in relation to the road, other vehicles on the road, and/or other objects within a vicinity of the vehicle 100. For example, the sensor fusion and RWM management vehicle application 212 may combine imagery data from the camera perception vehicle application 204 with arbitrated map location information from the map fusion and arbitration vehicle application 208 to refine the determined position of the vehicle within a lane of traffic. As another example, the sensor fusion and RWM management vehicle application 212 may combine object recognition and imagery data from the camera perception vehicle application 204 with object detection and ranging data from the radar perception vehicle application 202 to determine and refine the relative position of other vehicles and objects in the vicinity of the vehicle. As another example, the sensor fusion and RWM management vehicle application 212 may receive information from vehicle-to-vehicle (V2V) communications (such as via the CAN bus) regarding other vehicle positions and directions of travel and combine that information with information from the radar perception vehicle application 202 and the camera perception vehicle application 204 to refine the locations and motions of other vehicles. The sensor fusion and RWM management vehicle application 212 may output refined location and state information of the vehicle 100, as well as refined location and state information of other vehicles and objects in the vicinity of the vehicle, to the motion planning and control vehicle application 214 and/or the behavior planning and prediction vehicle application 216.

As a further example, the sensor fusion and RWM management vehicle application 212 may use dynamic traffic control instructions directing the vehicle 100 to change speed, lane, direction of travel, or other navigational element(s), and combine that information with other received information to determine refined location and state information. The sensor fusion and RWM management vehicle application 212 may output the refined location and state information of the vehicle 100, as well as refined location and state information of other vehicles and objects in the vicinity of the vehicle 100, to the motion planning and control vehicle application 214, the behavior planning and prediction vehicle application 216 and/or devices remote from the vehicle 100, such as a data server, other vehicles, etc., via wireless communications, such as through cellular vehicle-to-everything (C-V2X) connections, other wireless connections, etc.

In some examples, the sensor fusion and RWM management vehicle application 212 may monitor perception data from various sensors, such as perception data from the radar perception vehicle application 202, the camera perception vehicle application 204, other perception vehicle application, etc., and/or data from one or more sensors themselves to analyze conditions in the vehicle sensor data. The sensor fusion and RWM management vehicle application 212 may be configured to detect conditions in the sensor data, such as sensor measurements being at, above, or below a threshold, certain types of sensor measurements occurring, etc. The sensor fusion and RWM management vehicle application 212 may output the sensor data as part of the refined location and state information of the vehicle 100 provided to the behavior planning and prediction vehicle application 216 and/or devices remote from the vehicle 100, such as a data server, other vehicles, etc., via wireless communications, such as through C-V2X connections, other wireless connections, etc.

The refined location and state information may include vehicle descriptors associated with the vehicle 100 and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak breaks, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., 184); and/or owner/operator identification information.

The behavioral planning and prediction vehicle application 216 of the autonomous vehicle system 200 may use the refined location and state information of the vehicle 100 and location and state information of other vehicles and objects output from the sensor fusion and RWM management vehicle application 212 to predict future behaviors of other vehicles and/or objects. For example, the behavioral planning and prediction vehicle application 216 may use such information to predict future relative positions of other vehicles in the vicinity of the vehicle based on own vehicle position and velocity and other vehicle positions and velocity. Such predictions may take into account information from the HD map and route planning to anticipate changes in relative vehicle positions as host and other vehicles follow the roadway. The behavioral planning and prediction vehicle application 216 may output other vehicle and object behavior and location predictions to the motion planning and control vehicle application 214.

Additionally, the behavior planning and prediction vehicle application 216 may use object behavior in combination with location predictions to plan and generate control signals for controlling the motion of the vehicle 100. For example, based on route planning information, refined location in the roadway information, and relative locations and motions of other vehicles, the behavior planning and prediction vehicle application 216 may determine that the vehicle 100 needs to change lanes and accelerate, such as to maintain or achieve minimum spacing from other vehicles, and/or prepare for a turn or exit. As a result, the behavior planning and prediction vehicle application 216 may calculate or otherwise determine a steering angle for the wheels and a change to the throttle setting to be commanded to the motion planning and control vehicle application 214 and DBW system/control unit 220 along with such various parameters necessary to effectuate such a lane change and acceleration. One such parameter may be a computed steering wheel command angle.

The motion planning and control vehicle application 214 may receive data and information outputs from the sensor fusion and RWM management vehicle application 212 and other vehicle and object behavior as well as location predictions from the behavior planning and prediction vehicle application 216 and use this information to plan and generate control signals for controlling the motion of the vehicle 100 and to verify that such control signals meet safety requirements for the vehicle 100. For example, based on route planning information, refined location in the roadway information, and relative locations and motions of other vehicles, the motion planning and control vehicle application 214 may verify and pass various control commands or instructions to the DBW system/control unit 220.

The DBW system/control unit 220 may receive the commands or instructions from the motion planning and control vehicle application 214 and translate such information into mechanical control signals for controlling wheel angle, brake and throttle of the vehicle 100. For example, DBW system/control unit 220 may respond to the computed steering wheel command angle by sending corresponding control signals to the steering wheel controller.

In various aspects, the vehicle management system 200 may include functionality that performs safety checks or oversight of various commands, planning or other decisions of various vehicle applications that could impact vehicle and occupant safety. Such safety check or oversight functionality may be implemented within a dedicated vehicle application or distributed among various vehicle applications and included as part of the functionality. In some aspects, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction vehicle application 216 (or in a separate vehicle application) may determine the current or future separate distance between another vehicle (as refined by the sensor fusion and RWM management vehicle application 212) and the vehicle 100 (e.g., based on the world model refined by the sensor fusion and RWM management vehicle application 212), compare that separation distance to a safe separation distance parameter stored in memory, and issue instructions to the motion planning and control vehicle application 214 to speed up, slow down or turn if the current or predicted separation distance violates the safe separation distance parameter. As another example, safety or oversight functionality in the motion planning and control vehicle application 214 (or a separate vehicle application) may compare a determined or commanded steering wheel command angle to a safe wheel angle limit or parameter and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 2B:
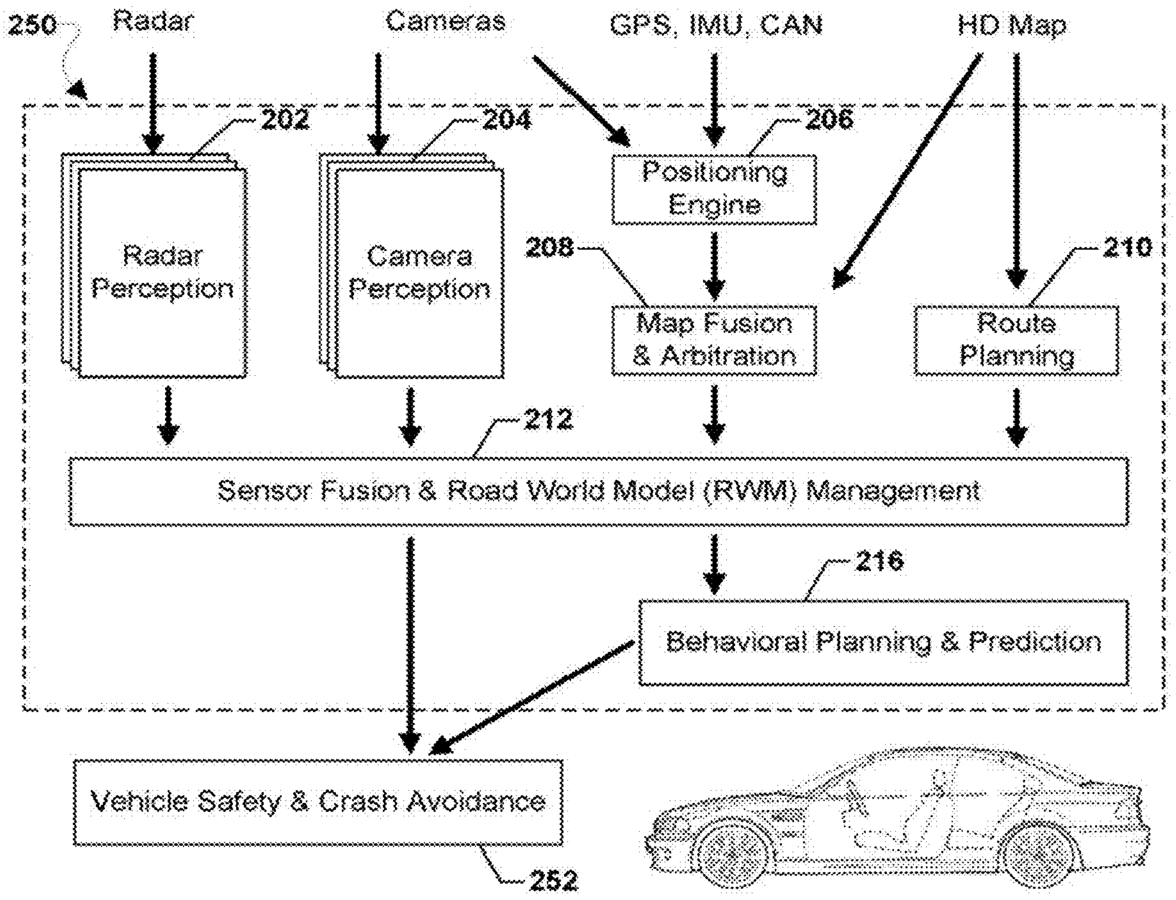
FIG. 2B is a component block diagram illustrating components of another example vehicle management system according to various aspects.

FIG. 2B illustrates an example of vehicle applications, subsystems, computational elements, or units within a vehicle management system 250, which may be utilized within a vehicle 100. With reference to FIGS. 1A-2B, in some aspects, the vehicle applications 202, 204, 206, 208, 210, 212, and 216 of the vehicle management system 200 may be similar to those described with reference to FIG. 2A and the vehicle management system 250 may operate similar to the vehicle management system 200, except that the vehicle management system 250 may pass various data or instructions to a vehicle safety and crash avoidance system 252 rather than the DBW system/control unit 220. For example, the configuration of the vehicle management system 250 and the vehicle safety and crash avoidance system 252 illustrated in FIG. 2B may be used in a non-autonomous vehicle.

In various aspects, the behavioral planning and prediction vehicle application 216 and/or the sensor fusion and RWM management vehicle application 212 may output data to the vehicle safety and crash avoidance system 252. For example, the sensor fusion and RWM management vehicle application 212 may output sensor data as part of refined location and state information of the vehicle 100 provided to the vehicle safety and crash avoidance system 252. The vehicle safety and crash avoidance system 252 may use the refined location and state information of the vehicle 100 to make safety determinations relative to the vehicle 100 and/or occupants of the vehicle 100. As another example, the behavioral planning and prediction vehicle application 216 may output behavior models and/or predictions related to the motion of other vehicles to the vehicle safety and crash avoidance system 252. The vehicle safety and crash avoidance system 252 may use the behavior models and/or predictions related to the motion of other vehicles to make safety determinations relative to the vehicle 100 and/or occupants of the vehicle 100.

In various aspects, the vehicle safety and crash avoidance system 252 may include functionality that performs safety checks or oversight of various commands, planning, or other decisions of various vehicle applications, as well as human driver actions, that could impact vehicle and occupant safety. In some aspects, a variety of safety parameters may be stored in memory and the vehicle safety and crash avoidance system 252 may compare a determined value (e.g., relative spacing to a nearby vehicle, distance from the roadway centerline, etc.) to corresponding safety parameter(s), and issue a warning or command if the safety parameter is or will be violated. For example, a vehicle safety and crash avoidance system 252 may determine the current or future separate distance between another vehicle (as refined by the sensor fusion and RWM management vehicle application 212) and the vehicle (e.g., based on the world model refined by the sensor fusion and RWM management vehicle application 212), compare that separation distance to a safe separation distance parameter stored in memory, and issue instructions to a driver to speed up, slow down or turn if the current or predicted separation distance violates the safe separation distance parameter. As another example, a vehicle safety and crash avoidance system 252 may compare a human driver's change in steering wheel angle to a safe wheel angle limit or parameter and issue an override command and/or alarm in response to the steering wheel angle exceeding the safe wheel angle limit.

As indicated above, segmentation may be performed on image data to generate a segmentation mask for the image data. In some cases, one or more machine learning techniques may be used to perform the segmentation, such as using one or more neural networks. A neural network is an example of a machine learning system, and a neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input. The connections between layers of a neural network may be fully connected or locally connected. Various examples of neural network architectures are described below with respect to FIG. 3A-FIG. 4.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
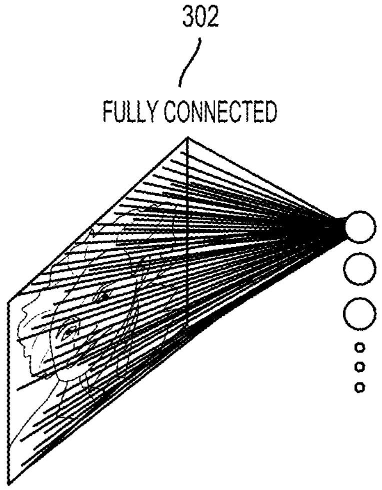
FIG. 3A-FIG. 3D and FIG. 4 are diagrams illustrating examples of neural networks, in accordance with some aspects.
Figure 3B:
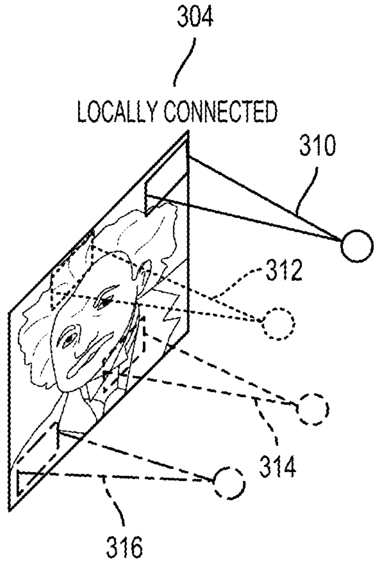

The connections between layers of a neural network may be fully connected or locally connected. FIG. 3A illustrates an example of a fully connected neural network 302. In a fully connected neural network 302, a neuron in a first layer may communicate its output to every neuron in a second layer, so that each neuron in the second layer will receive input from every neuron in the first layer. FIG. 3B illustrates an example of a locally connected neural network 304. In a locally connected neural network 304, a neuron in a first layer may be connected to a limited number of neurons in the second layer. More generally, a locally connected layer of the locally connected neural network 304 may be configured so that each neuron in a layer will have the same or a similar connectivity pattern, but with connections strengths that may have different values (e.g., values 310, 312, 314, and 316). The locally connected connectivity pattern may give rise to spatially distinct receptive fields in a higher layer because the higher layer neurons in a given region may receive inputs that are tuned through training to the properties of a restricted portion of the total input to the network.

Figure 3C:
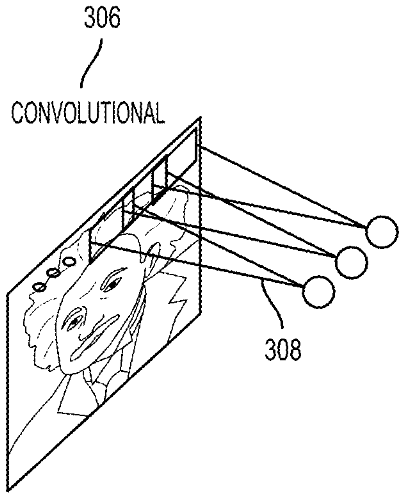

One example of a locally connected neural network is a convolutional neural network. FIG. 3C illustrates an example of a convolutional neural network 306. The convolutional neural network 306 may be configured such that the connection strengths associated with the inputs for each neuron in the second layer are shared (e.g., inputs 308). Convolutional neural networks may be well suited to problems in which the spatial location of inputs is meaningful. Convolutional neural network 306 may be used to perform one or more aspects of video compression and/or decompression, according to aspects of the present disclosure.

Figure 3D:
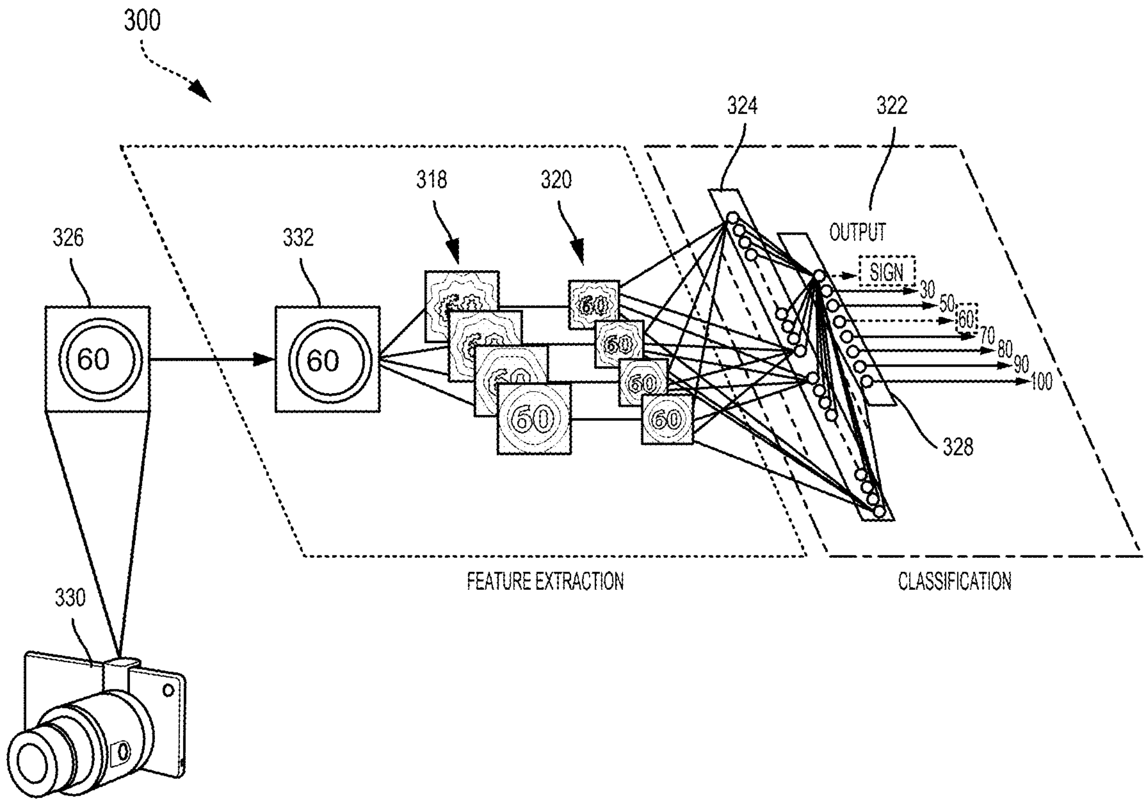

One type of convolutional neural network is a deep convolutional network (DCN). FIG. 3D illustrates a detailed example of a DCN 300 designed to recognize visual features from an image 326 input from an image capturing device 330, such as a car-mounted camera. The DCN 300 of the current example may be trained to identify traffic signs and a number provided on the traffic sign. The DCN 300 may be trained for other tasks, such as identifying lane markings or identifying traffic lights.

The DCN 300 may be trained with supervised learning. During training, the DCN 300 may be presented with an image, such as the image 326 of a speed limit sign, and a forward pass may then be computed to produce an output 322. The DCN 300 may include a feature extraction section and a classification section. Upon receiving the image 326, a convolutional layer 332 may apply convolutional kernels (not shown) to the image 326 to generate a first set of feature maps 318. As an example, the convolutional kernel for the convolutional layer 332 may be a 5×5 kernel that generates 28×28 feature maps. In the present example, because four different feature maps are generated in the first set of feature maps 318, four different convolutional kernels were applied to the image 326 at the convolutional layer 332. The convolutional kernels may also be referred to as filters or convolutional filters.

The first set of feature maps 318 may be subsampled by a max pooling layer (not shown) to generate a second set of feature maps 320. The max pooling layer reduces the size of the first set of feature maps 318. That is, a size of the second set of feature maps 320, such as 14×14, is less than the size of the first set of feature maps 318, such as 28×28. The reduced size provides similar information to a subsequent layer while reducing memory consumption. The second set of feature maps 320 may be further convolved via one or more subsequent convolutional layers (not shown) to generate one or more subsequent sets of feature maps (not shown).

In the example of FIG. 3D, the second set of feature maps 320 is convolved to generate a first feature vector 324. Furthermore, the first feature vector 324 is further convolved to generate a second feature vector 328. Each feature of the second feature vector 328 may include a number that corresponds to a possible feature of the image 326, such as "sign," "60," and "100." A softmax function (not shown) may convert the numbers in the second feature vector 328 to a probability. As such, an output 322 of the DCN 300 is a probability of the image 326 including one or more features.

In the present example, the probabilities in the output 322 for "sign" and "60" are higher than the probabilities of the others of the output 322, such as "30," "40," "50," "70," "80," "90," and "100". Before training, the output 322 produced by the DCN 300 is likely to be incorrect. Thus, an error may be calculated between the output 322 and a target output. The target output is the ground truth of the image 326 (e.g., "sign" and "60"). The weights of the DCN 300 may then be adjusted so the output 322 of the DCN 300 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., feature maps 320) receiving input from a range of neurons in the previous layer (e.g., feature maps 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 4:
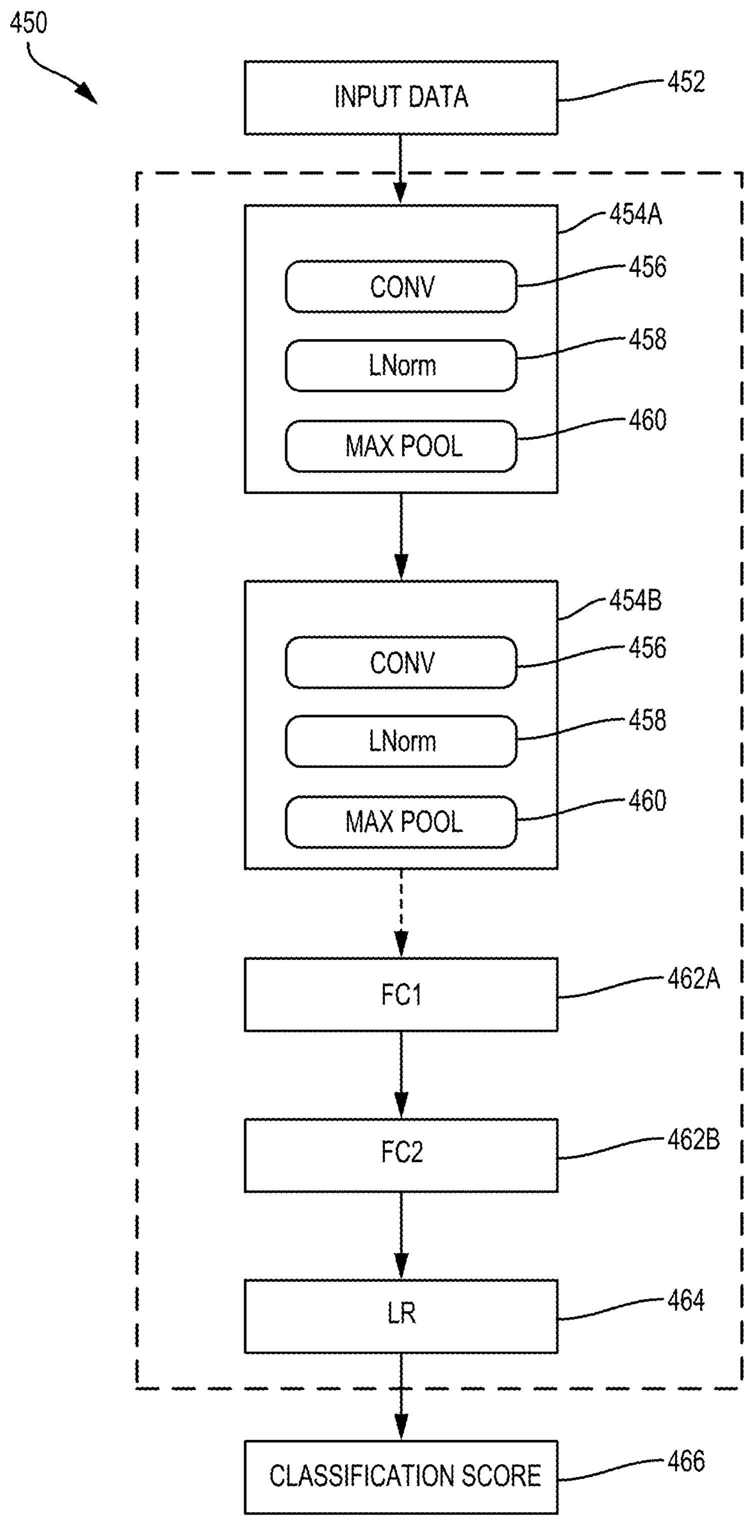

FIG. 4 is a block diagram illustrating an example of a deep convolutional network 450. The deep convolutional network 450 may include multiple different types of layers based on connectivity and weight sharing. As shown in FIG. 4, the deep convolutional network 450 includes the convolution blocks 454A, 454B. Each of the convolution blocks 454A, 454B may be configured with a convolution layer (CONV) 456, a normalization layer (LNorm) 458, and a max pooling layer (MAX POOL) 460.

The convolution layers 456 may include one or more convolutional filters, which may be applied to the input data 452 to generate a feature map. Although only two convolution blocks 454A, 454B are shown, the present disclosure is not so limiting, and instead, any number of convolution blocks (e.g., convolution blocks 454A, 454B) may be included in the deep convolutional network 450 according to design preference. The normalization layer 458 may normalize the output of the convolution filters. For example, the normalization layer 458 may provide whitening or lateral inhibition. The max pooling layer 460 may provide down sampling aggregation over space for local invariance and dimensionality reduction.

The parallel filter banks, for example, of a deep convolutional network may be loaded on a CPU 110 or GPU 115 of an SOC 105 to achieve high performance and low power consumption. In alternative aspects, the parallel filter banks may be loaded on the DSP 106 or an ISP 175 of an SOC 105. In addition, the deep convolutional network 450 may access other processing blocks that may be present on the SOC 105, such as sensor processor 155 and navigation module 195, dedicated, respectively, to sensors and navigation.

The deep convolutional network 450 may also include one or more fully connected layers, such as layer 462A (labeled "FC1") and layer 462B (labeled "FC2"). The deep convolutional network 450 may further include a logistic regression (LR) layer 464. Between each layer 456, 458, 460, 462A, 462B, 464 of the deep convolutional network 450 are weights (not shown) that are to be updated. The output of each of the layers (e.g., 456, 458, 460, 462A, 462B, 464) may serve as an input of a succeeding one of the layers (e.g., 456, 458, 460, 462A, 462B, 464) in the deep convolutional network 450 to learn hierarchical feature representations from input data 452 (e.g., images, audio, video, sensor data and/or other input data) supplied at the first of the convolution blocks 454A. The output of the deep convolutional network 450 is a classification score 466 for the input data 452. The classification score 466 may be a set of probabilities, where each probability is the probability of the input data including a feature from a set of features.

Figure 5:
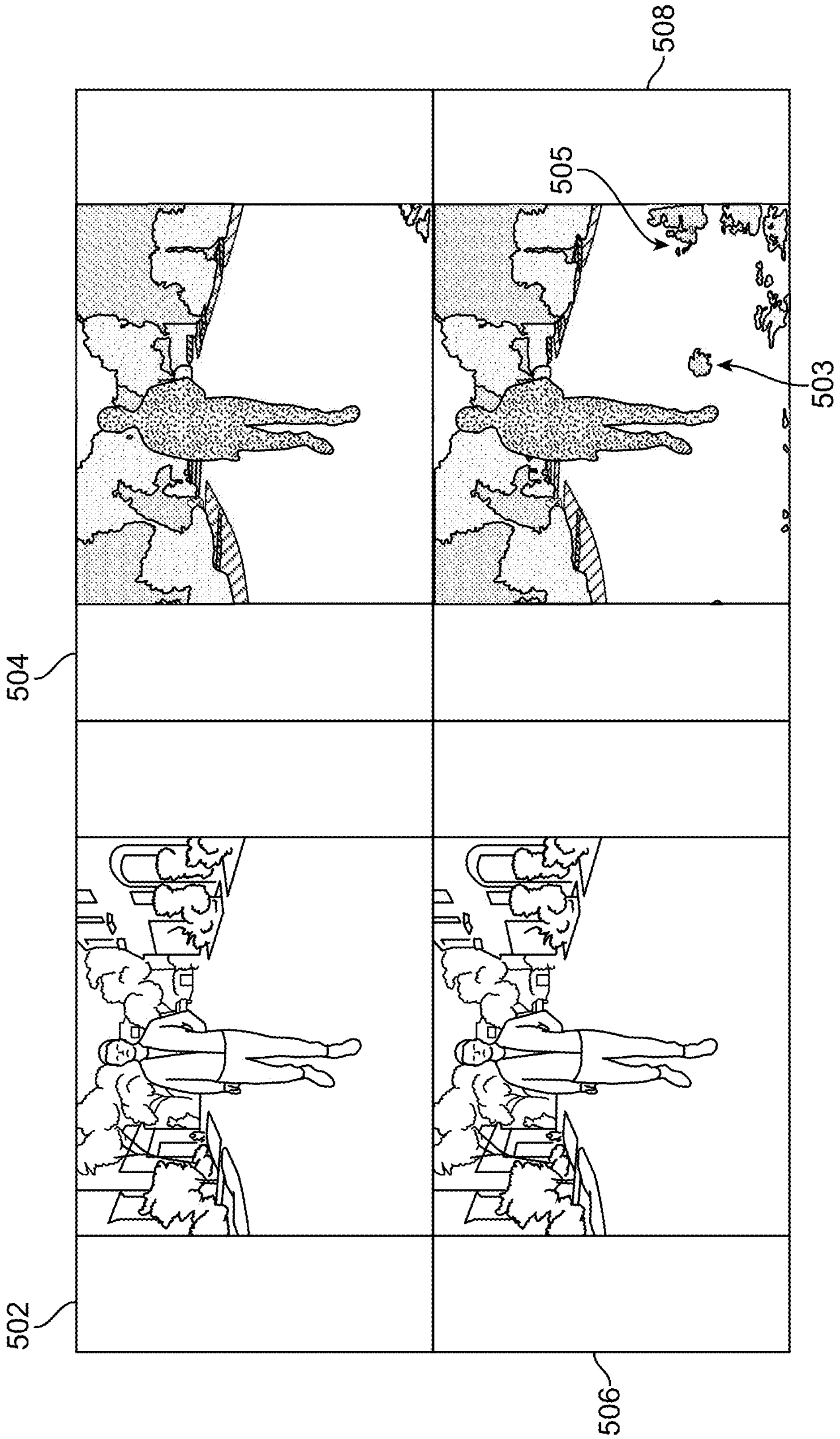
FIG. 5 are images and corresponding segmentation masks illustrating examples of inconsistent segmentation results of a same image under different image signal processor (ISP) settings, in accordance with aspects of the present disclosure.

As noted previously, segmentation can be important for many use cases, including extended reality (XR) applications (e.g., AR, VR, MR, etc.), autonomous driving, cameras of mobile devices, IoT devices or systems, among others. Current segmentation solutions (e.g., that are deployed on-device) may provide inconsistent semantic representations. FIG. 5 illustrates examples of inconsistent segmentation results of a same image under different image signal processor (ISP) settings. As shown, a first image 502 with first ISP settings results in a segmentation mask 504. However, based on processing a second image 506 (e.g., of the same scene) with second ISP settings, a segmentation mask 508 may be generated with different pixel classifications for a first portion 503 and a second portion 505 of the segmentation mask 508 as compared to similar portions in the segmentation mask 504.

Figure 6:
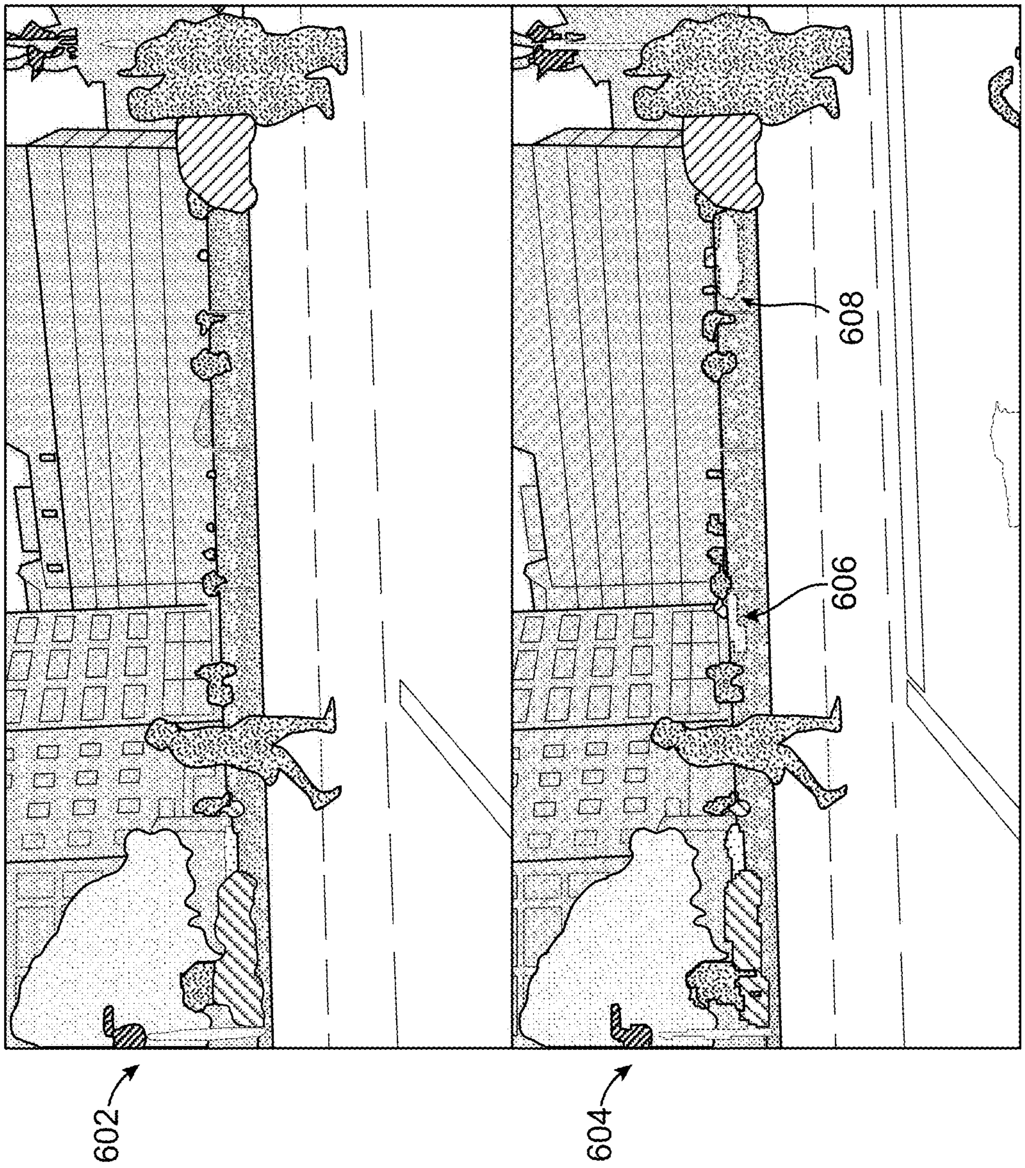
FIG. 6 are segmentation masks illustrating examples of inconsistent segmentation results between adjacent images, in accordance with aspects of the present disclosure.

FIG. 6 illustrates examples of inconsistent segmentation results between adjacent images over time, which is referred to as temporal inconsistency between segmentation masks. As shown, a segmentation mask 604 for a current image is generated that includes inconsistent pixel classifications as compared to a segmentation mask 602 generated for a prior image (an image preceding the current image in a video in a video or other sequence of images). A result of temporally inconsistent segmentation masks (due to the inconsistent predictions between images or frames) is flickering artifacts.

One possible approach to resolve temporal inconsistency using a neural network is to use optical flow to morph the features between images or frames. However, optical flow can be challenging due to significant computations on a device making the neural network very slow.

Figure 7:
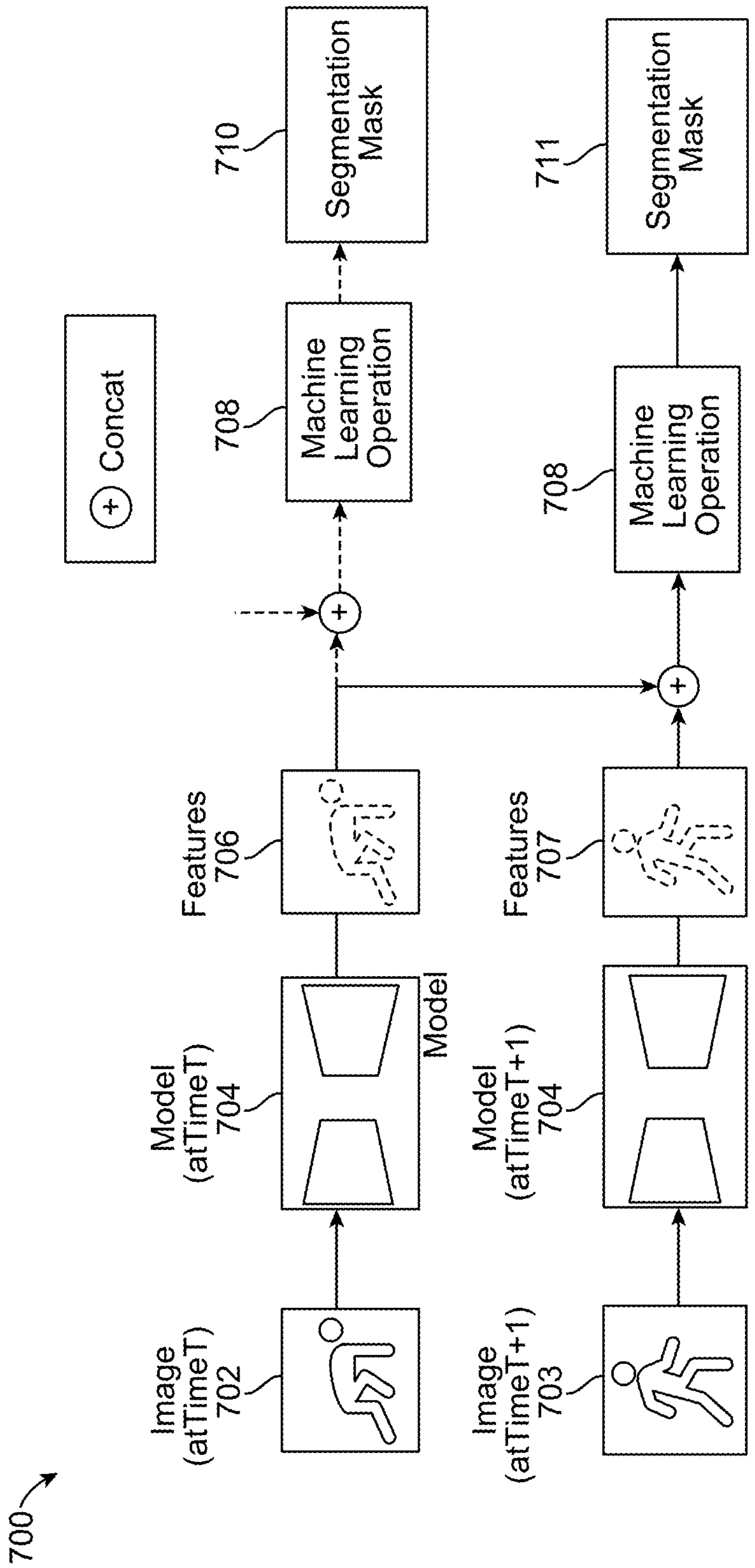
FIG. 7 is a diagram illustrating an example of machine learning system for generating segmentation masks from images, in accordance with aspects of the present disclosure.

In some cases, a technique to resolve temporal inconsistency is to aggregate features from one or more previous images and use the aggregated features to process a current image to generate a segmentation mask. FIG. 7 is a diagram illustrating an example of a machine learning system 700 configured to perform such an approach. As shown, a prior image 702 (at time T) is processed by a machine learning model 704 (shown at time instance T) to generate features 706 representing the prior image 702. A current image 703 (at time T+1, which is a next time step after time T) is also processed by the machine learning model 704 (shown at time instance T+1) to generate features 707 representing the current image 703. The features 706 representing the prior image 702 are combined (e.g., concatenated) with the features 707 representing the current image 703 to generate combined features for the current image 703.

The features 706 representing the prior image 702 (and/or a combined representation based on combining the features 706 with features generated for a prior image at T−1 (not shown)) can be processed by a machine learning operation 708 to generate a segmentation mask 710 for the prior image 702. In some aspects, the machine learning operation 708 may be a convolutional operation, such as (but not limited to) a two-dimensional (2D) convolutional operation using a 1×1 convolutional filter (Conv2d 1×1). The combined features (of features 706 and 707) generated for the current image 703 can be processed by the machine learning operation 708 to generate a segmentation mask 711 for the current image 703.

Figure 8:
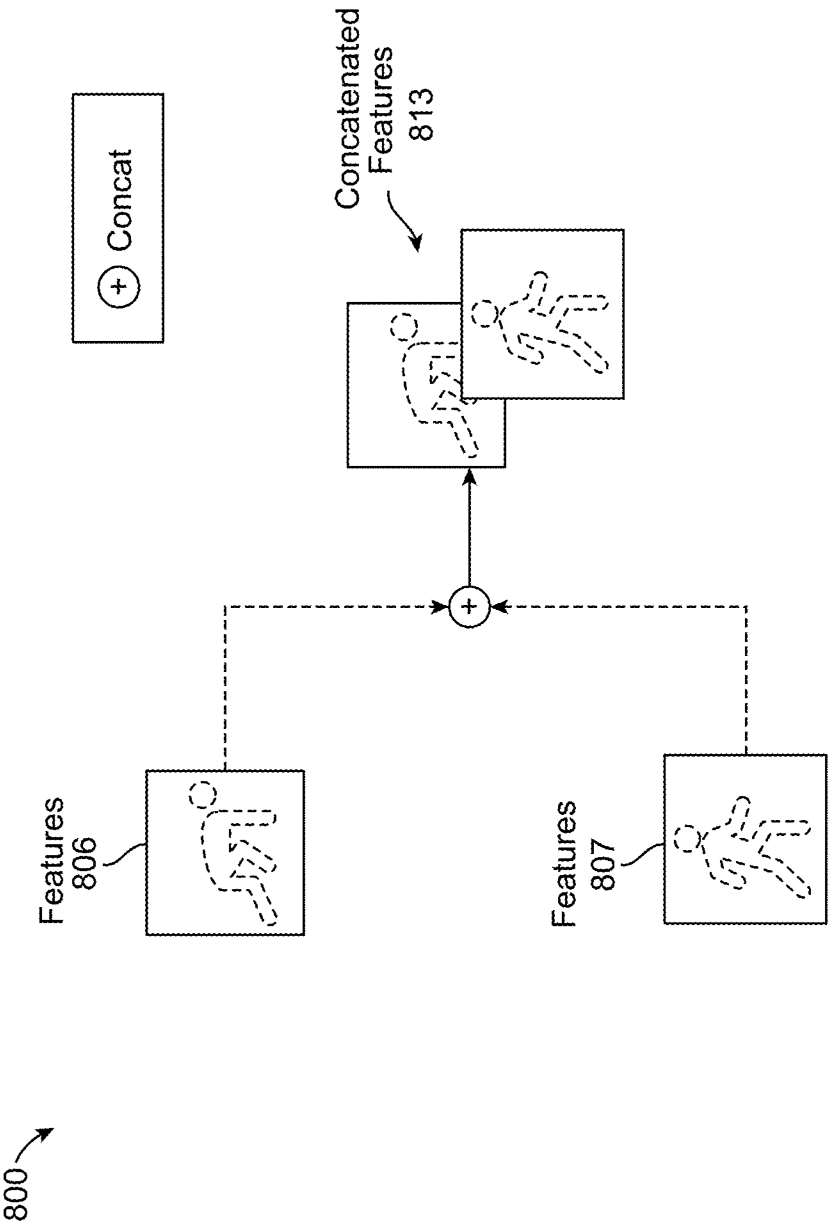
FIG. 8 is a diagram illustrating an example of concatenation of features of a prior image and features of a current image, in accordance with aspects of the present disclosure.

Using features from previous images helps in providing consistent results. However, concatenation of two features which are not pixel-aligned may lead to additional inconsistencies in segmentation masks. FIG. 8 is a diagram 800 illustrating an example of concatenated features 813 that are not pixel-aligned. For example, features 806 can be generated (e.g., by the machine learning model 704) based on a prior image (e.g., at time instance T) and features 807 can be generated (e.g., by the machine learning model 704) based on a current image (an image occurring after the prior image in a video or other sequence of images; e.g., at time instance T+1). The features 806 can be combined with the features 807 (e.g., through a concatenation operation referred to as "concat") to generate the concatenated features (also referred to as combined features) 813. As shown, the pose of the person represented in the features 806 is not aligned with the pose of the person represented in the features 807, causing the concatenated features 813 to be non-pixel-aligned.

Figure 9:
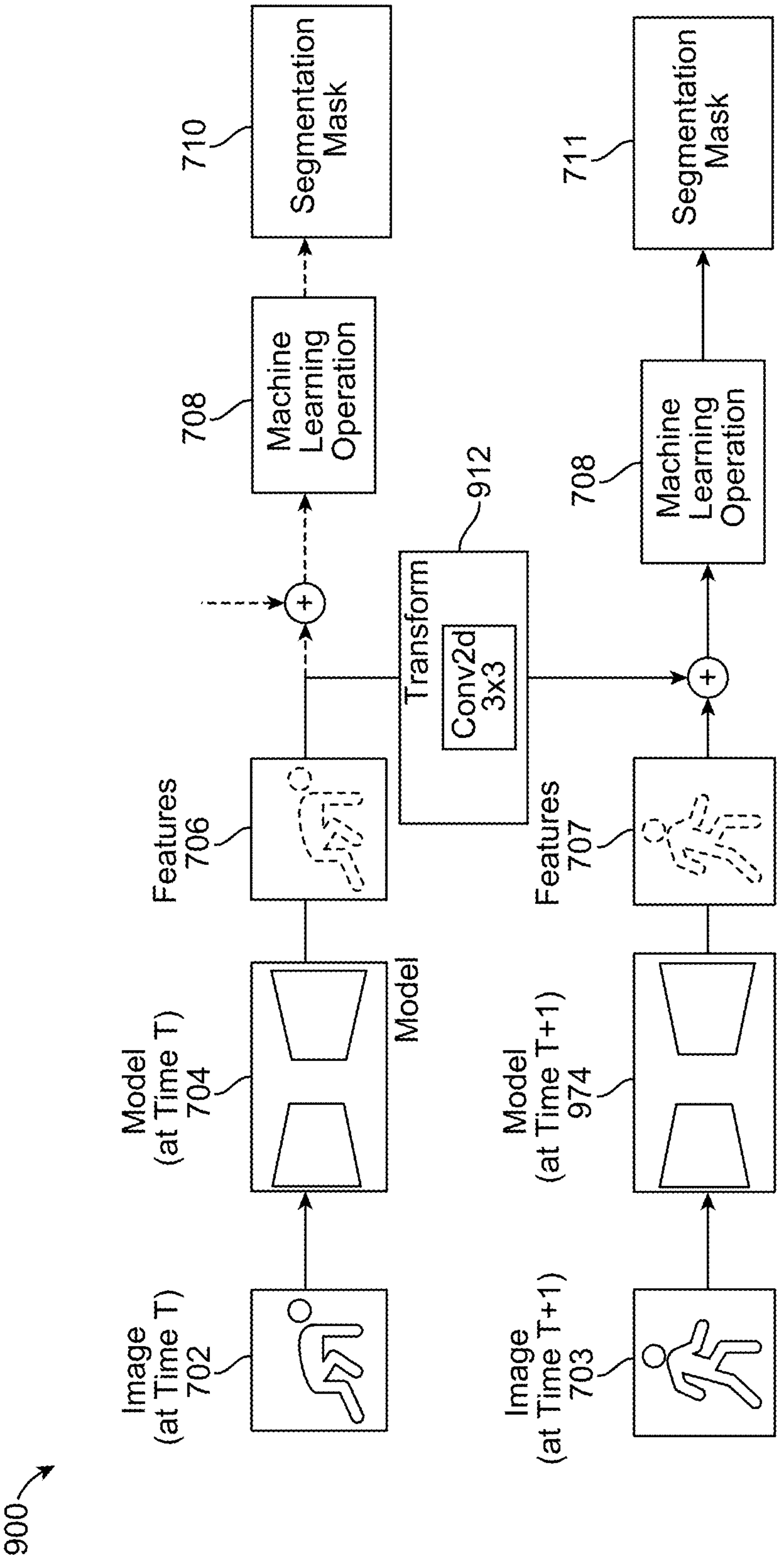
FIG. 9 is a diagram illustrating an example of machine learning system including a transform operation for generating segmentation masks from images, in accordance with aspects of the present disclosure.

In some cases, a block (e.g., a transform operation block) may be added in the machine learning system to transform features generated for a prior image so that the features corresponding to an object in the prior image are aligned with features corresponding to the same object in the current image (and thus are pixel-aligned). FIG. 9 is a diagram illustrating an example of a machine learning system 900 including a transform operation 912 added to the machine learning system 700 of FIG. 7 for generating segmentation masks from images. Adding such a block may improve performance, but such a machine learning system 900 may be modified to provide an understanding of position of the object in the current image.

Figure 10:
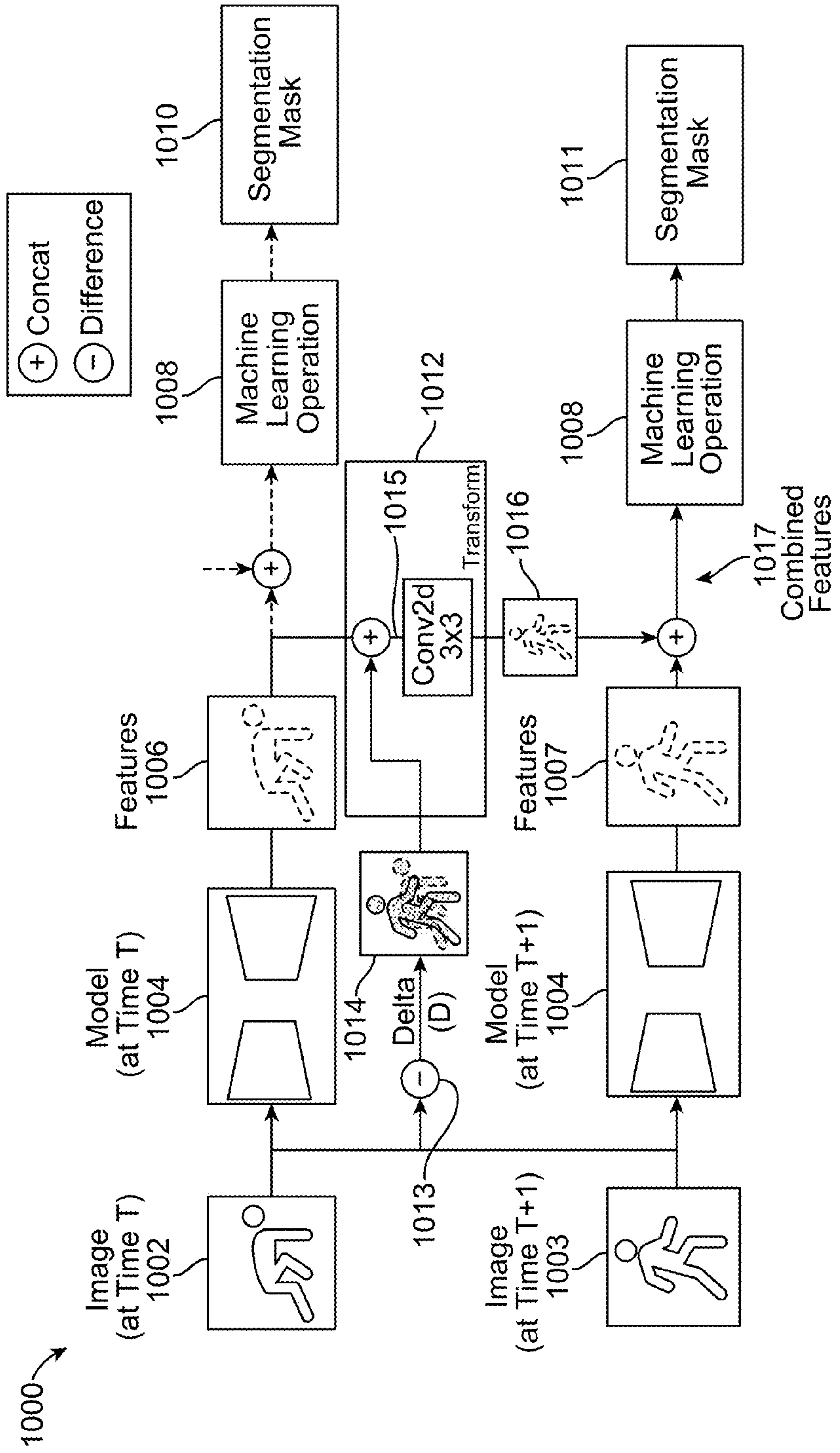
FIG. 10 is a diagram illustrating an example of machine learning system including a transform operation that utilizes a delta image for generating segmentation masks from images, in accordance with aspects of the present disclosure.

As noted above, the systems and techniques described herein provide a machine learning system that utilizes delta images to generate segmentation masks for images. FIG. 10 is a diagram illustrating an example of a machine learning system 1000 that includes a transform operation 1012 (which may correspond to the transform operation 912). The transform operation 1012 uses a delta image 1014 to transform a prior image 1002 (e.g., from time instance T) so that features 1006 representing the prior image 1002 are pixel-aligned with features 1006 representing a current image 1003 (e.g., from time instance T+1 or later). The delta image 1014 can thus be used by the transform operation 1012 to transform the features 1006 to the next time step (e.g., time instance T+1).

As shown in FIG. 10, the machine learning system 1000 performs a difference operation to determine a difference between the prior image 1002 (at time T) and the current image 1003 (at time T+1, which may be a next time step after time T). A result of the difference operation between the prior image 1002 and the current image 1003 is the delta image 1014 (also referred to as a difference image). In some cases, the difference operation may include determining a difference between each pixel of the current image 1003 and each corresponding pixel (at a common location within the image frame) of the prior image 1002, resulting in a difference value for each pixel location in the delta image 1014. In some aspects, the delta image can be multiplied by one or more segmentation masks from one or more previous outputs of the machine learning system, which can result in one or more "masked" delta images (e.g., a batch of masked delta images).

The prior image 1002 is processed by a machine learning model 1004 (shown at time instance T) to generate the features 1006 representing the prior image 1002. In some cases, the machine learning model 1004 may identify certain features in input images. In some examples, the machine learning model 1004 may include one or more layers (e.g., hidden layers such as convolutional layers, normalization layers, pooling layers, and/or other layers) or transformer blocks which may generate feature maps for recognizing certain features. In some cases, the machine learning model 1004 includes an encoder-decoder neural network architecture. Illustrative examples of the machine learning model 1004 include the fully connected neural network 302 of FIG. 3A, the locally connected neural network 304 of FIG. 3B, the convolutional neural network 306 of FIG. 3C, the deep convolutional network (DCN) 300 of FIG. 3D, and/or other type of ML model.

The current image 1003 is also processed by the machine learning model 1004 (shown at time instance T+1) to generate the features 1007 representing the current image 1003. In some cases, the machine learning system 1000 may generate the delta image by determining a difference between intermediate features generated for the prior image 1002 by the machine learning model 1004 and intermediate features generated for the current image 1003 by the machine learning model 1004. For instance, the intermediate features can be output by one or more intermediate layers (e.g., hidden layers that are prior to a final layer) of the machine learning model 1004.

The features 1006 representing the prior image 1002 are combined (e.g., concatenated using a concatenation operation) with the pixels or features of the delta image 1014 (or a masked delta image) to generate combined features 1015. The combined features 1015 are then processed using the transform operation 1012 to generate transformed features 1016 for the prior image 1002. The transformed features 1016 for the prior image 1002 are combined (e.g., concatenated) with the features 1007 representing the current image 1003 to generate combined features (also referred to as concatenated features) 1017. The resulting combined features 1017 are processed by a machine learning operation 1008 (e.g., a Conv2d 1×1 operation) to generate a segmentation mask 1011 for the current image 1003. The features 1006 representing the prior image 1002 (and/or a combined representation based on combining the features 1006 with transformed features generated for a prior image at T−1) can also be processed by the machine learning operation 1008 to generate a segmentation mask 1010 for the prior image 1002.

In some aspects, the transform operation 1012 may be a convolutional operation performed using a convolutional filter or kernel (e.g., a 2D 3×3 convolutional filter or kernel). In some cases, the transform operation 1012 may be a deformable convolution operation (e.g., using DCN-v2n) performed using a deformable convolutional filter or kernel. In some cases, the transform operation 1012 may be a transformer block. In some examples, keys of the transformer are previous features and queries are the delta image 1014 (or a masked delta image).

In some aspects, parameters of the transform operation 1012 (e.g., weights of the convolutional filter or kernel, weight offsets of a deformable convolution such as DCN-v2, etc.) may be fixed in different iterations of the machine learning system 1000 generating segmentation masks for input images. For example, the weights of a convolutional filter of the transform operation 1012 may remain fixed (or constant) when transforming different delta images.

Figure 11:
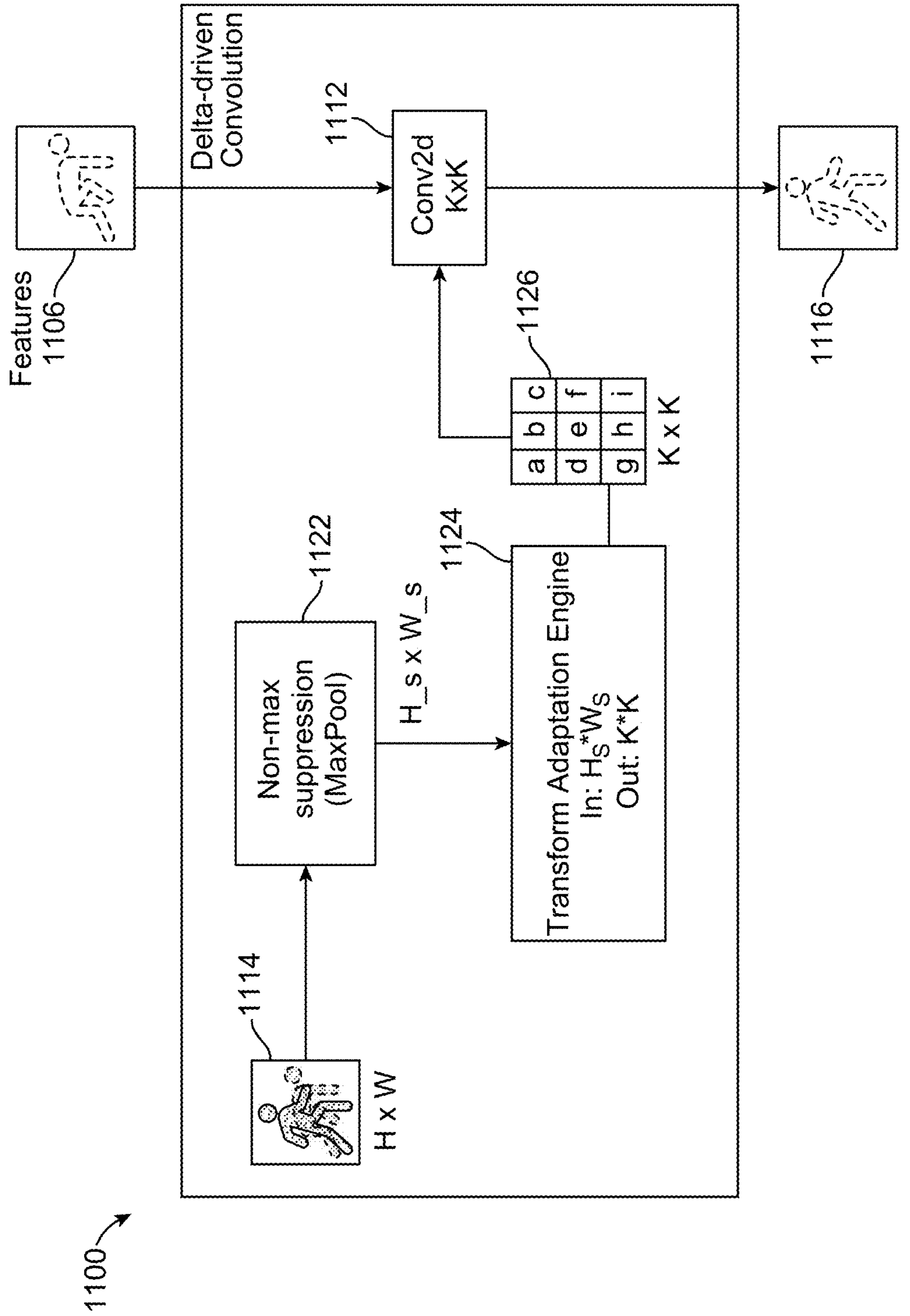
FIG. 11 is a diagram illustrating an example of convolutional operation that varies based on values of a delta image, in accordance with aspects of the present disclosure.

In some aspects, parameters of the transform operation 1012 (e.g., weights of the convolutional filter or kernel, weight offsets of a deformable convolution such as DCN-v2, etc.) may be varied or modified for each iteration of the machine learning system 1000 (when processing a new image to generate a segmentation mask for new image) based on the delta image 1014. FIG. 11 is a diagram illustrating an example of a system 1100 that can vary a transform operation 1112 (e.g., a convolutional operation) based on values of a delta image 1114 (which can be similar to the delta image 1014 of FIG. 10).

As shown in the illustrative example of FIG. 11, the delta image 1114 is input to a non-maximum suppression engine 1122. The delta image is shown to have a height (H) and a width (W), which may be any suitable size. In some examples, the non-maximum suppression engine 1122 may perform a max-pooling operation (e.g., using one or more max-pooling layers). In other examples, the non-maximum suppression engine 1122 may perform other forms of pooling functions, such as average pooling, L2-norm pooling, or other suitable pooling functions. The max-pooling operation may include down sampling for dimensionality reduction, which can help the delta image information to provide a better transformation of the features of the prior image. In some cases, max-pooling can be performed by applying a max-pooling filter (e.g., having a size of 2×2) with a step amount (e.g., equal to a dimension of the filter, such as a step amount of 2) to the delta image 1114. The output from the max-pooling filter may include the maximum number in every sub-region around which the filter convolves. Using a 2×2 filter as an illustrative example, each unit in the pooling layer can summarize a region of 2×2 nodes in the previous layer (with each node being a value in the delta image 1114). For instance, four values (nodes) in the delta image 1114 may be analyzed by the 2×2 max-pooling filter at each iteration of the filter, with the maximum value from the four values being output as the "max" value. As noted above, in some examples, an L2-norm pooling filter could also be used. The L2-norm pooling filter includes computing the square root of the sum of the squares of the values in the 2×2 region (or other suitable region) of the delta image 1114 (instead of computing the maximum values as is done in max-pooling) and using the computed values as an output.

The output from the non-maximum suppression engine 1122 includes an array of values having a reduced dimensionality with a height of $H_s$ and a width of $W_s$. The array is flattened from a two-dimensional (2D) representation (of height and width $H_s$×$W_s$) to a one-dimensional (1D) representation (e.g., a vector or tensor with a dimension of $H_s$*$W_s$). The 1D representation is input to a transform adaptation engine 1124 that is configured to generate or determine values for a transform operation 1112 (e.g., transform operation 1012). In some aspects, the transform adaptation engine 1124 may include a Multilayer perceptron (MLP) network, a fully connected layer, and/or other deep neural network. The transform adaptation engine 1124 processes the 1D representation of the delta image 1114 to generate a 1D set of parameter values (e.g., weights) having size K*K. For instance, the transform adaptation engine 1124 may include one or more convolutional filters (and/or other types of machine learning operations) that process the 1D representation of the delta image 1114 to generate the K*K parameter values. The 1D K*K parameter values may then be re-shaped to generate an array 1126 of parameter values having a dimension of height K×width K (K×K). The K×K array 1126 can be used as a convolutional filter or kernel for the transform operation 1112. As a result, the transform operation 1112 (using the K×K array 1126 as a filter or kernel) is determined by based on the pixel or feature values of the delta image 1114. Using such a technique, the transform operation 1112 can be adapted based on each particular delta image determined based on at least two images (e.g., adjacent images or video frames in a video).

As described above with respect to FIG. 10, the transform operation 1112 can be used to generate transformed features for a prior image used to generate the delta image 1114. For instance, the transform operation 1112 can use the delta image 1114 to transform features representing the prior image to a next time step (corresponding to a time step of a current image used to generate the delta image 1114) so that the features representing the prior image are pixel-aligned with features representing the current image.

Using the delta image-based systems and techniques described herein can reduce or eliminate temporal inconsistencies between segmentation masks and can thus improve quality of image processing operations.

Figure 12:
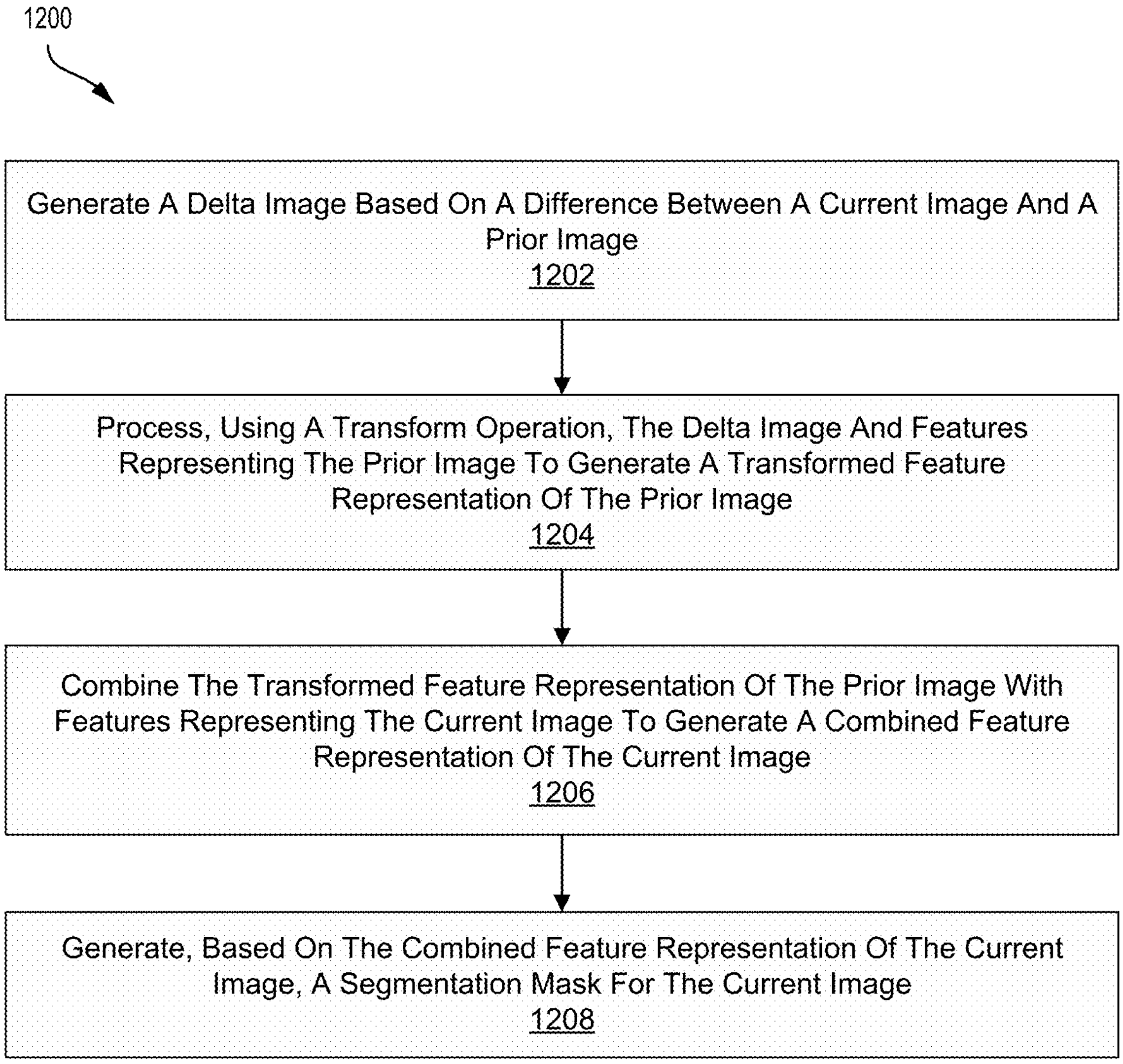
FIG. 12 is a flow diagram illustrating an example of a process for processing one or more images, in accordance with aspects of the present disclosure.

FIG. 12 is a flow diagram illustrating a process 1200 for processing one or more images, in accordance with aspects of the present disclosure. In some examples, the process 1200 may be performed by a computing device or by a component or system (e.g., a chipset, such as the SOC 105 of FIG. 1D) of the computing device. The computing device may implement a machine learning system, such as the machine learning system 1000 of FIG. 10, to perform the delta-image based techniques described herein. The computing device can include a vehicle (e.g., the vehicle 100 of FIG. 1A) or a computing system or component of the vehicle, a mobile device such as a mobile phone, an extended reality (XR) device such as a virtual reality (VR) device or augmented reality (AR) device, a network-connected wearable device (e.g., a network-connected watch), or other computing device. In some cases, the computing device may include the computing system 1300 of FIG. 13.

Figure 13:
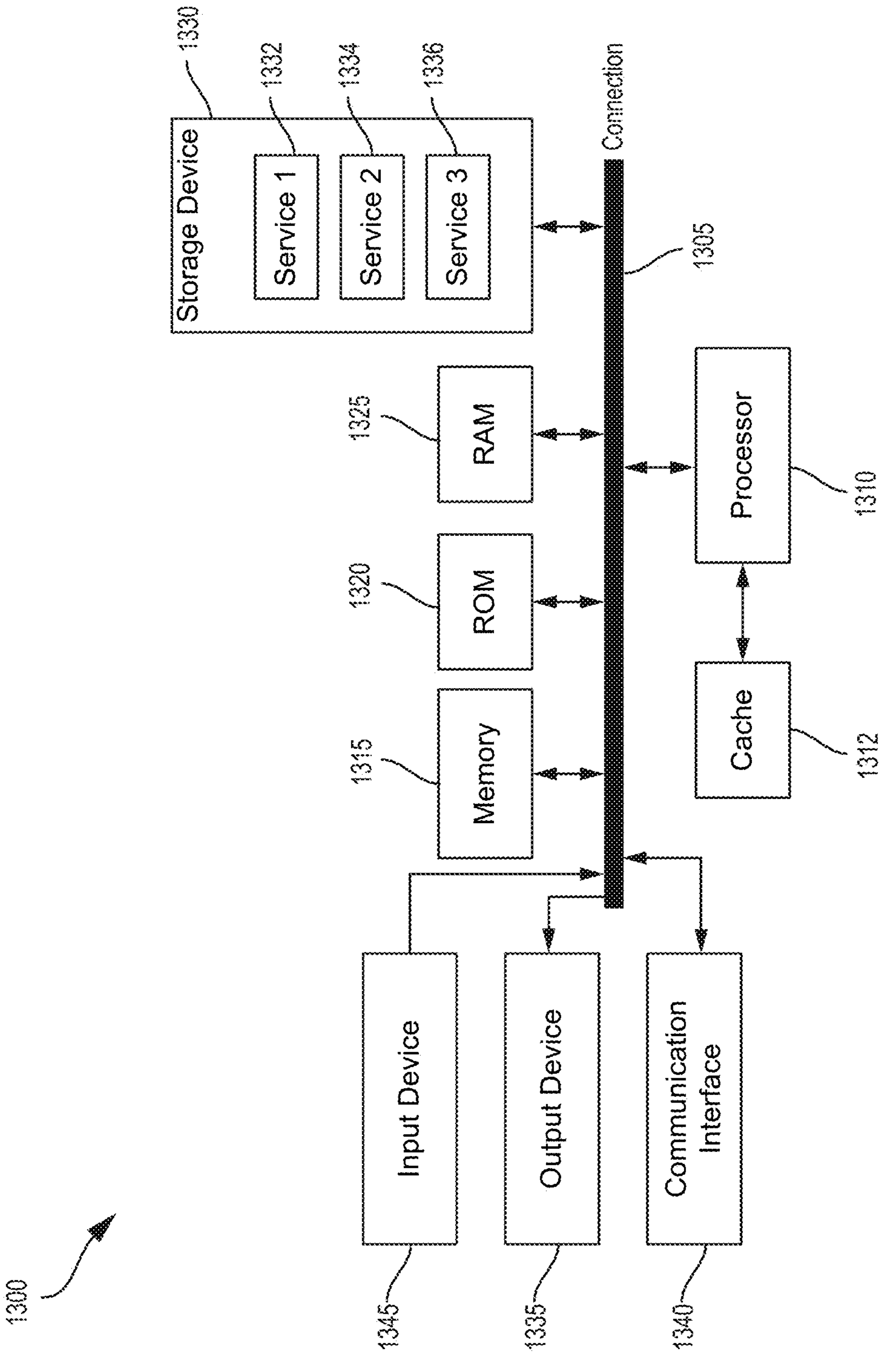
FIG. 13 illustrates an example computing device architecture of an example computing device which can implement the various techniques described herein.

The operations of the process 1200 may be implemented as software components that are executed and run on one or more processors (e.g., processor 1310 of FIG. 13 or other processor(s)). The transmission and reception of signals by the computing device in the process 1200 may be enabled, for example, by one or more antennas and/or one or more transceivers (e.g., wireless transceiver(s)).

At block 1202, the computing device (or component thereof) can generate a delta image based on a difference between a current image and a prior image to. In some examples, the current image can include the image 1003 (at time T+1) of FIG. 10, the prior image can include the image 1002 (at time T), and the delta image can include the delta image 1014.

In some aspects, the computing device (or component thereof) can process, using the machine learning model, the prior image to generate intermediate features representing the prior image (e.g., features output by one or more intermediate hidden layers of the machine learning model 1004 at time T of FIG. 10). The computing device (or component thereof) can process, using the machine learning model, the current image to generate intermediate features representing the current image (e.g., features output by one or more intermediate hidden layers of the machine learning model 1004 at time T+1 of FIG. 10). In some cases, the computing device (or component thereof) can further determine a difference between the intermediate features representing the prior image and the intermediate features representing the current image. The computing device (or component thereof) can then generate the delta image based on the difference between the intermediate features representing the prior image and the intermediate features representing the current image.

At block 1204, the computing device (or component thereof) can process, using a transform operation, the delta image and features representing the prior image to generate a transformed feature representation of the prior image. In some examples, the features representing the prior image can include the features 1006 of FIG. 10, the transform operation can include the transform operation 1012, and the transformed feature representation of the prior image can include the transformed features 1016. In some aspects, the computing device (or component thereof) can process, using a machine learning model, the prior image to generate the features representing the prior image. In some cases, the machine learning model can include the machine learning model 1004 (at time T) of the machine learning system 1000 of FIG. 10.

In some aspects, computing device (or component thereof) can combine the delta image with the features representing the prior image to generate a combined feature representation of the prior image (e.g., as shown in FIG. 10). In some cases, to process (using the transform operation) the delta image and the features representing the prior image to generate the transformed feature representation of the prior image, the computing device (or component thereof) can process, using the transform operation, the combined feature representation of the prior image to generate the transformed feature representation of the prior image (e.g., as shown in FIG. 10).

In some examples, the transform operation includes a convolutional operation performed using at least one convolutional filter. In some cases, weights of the at least one convolutional filter are fixed. In some cases, weights of the at least one convolutional filter are modified based on the delta image (e.g., by the system 1100 described with respect to FIG. 11). In some aspects, the at least one convolutional filter includes a deformable convolution. In some aspects, at least one weight offset of the deformable convolution is modified based on the delta image. In some examples, the transform operation includes a transformer operation performed using at least one transformer block.

At block 1206, the computing device (or component thereof) can combine the transformed feature representation of the prior image with features representing the current image to generate a combined feature representation of the current image. In some aspects, the features representing the current image can include the features 1007 of FIG. 10, and the combined feature representation of the current image can include the combined features 1017. In some cases, computing device (or component thereof) can process, using the machine learning model, the current image to generate the features representing the current image. In some examples, the machine learning model can include the machine learning model 1004 (at time T+1) of the machine learning system 1000 of FIG. 10.

At block 1208, the computing device (or component thereof) can generate, based on the combined feature representation of the current image, a segmentation mask for the current image. In some aspects, the segmentation mask for the current image can include the segmentation mask 1011 of FIG. 10 generated for the image 1003. Referring to FIG. 10 as an example, the machine learning operation 1008 (e.g., a Conv2d 1×1 operation) can process the combined features 1017 to generate a segmentation mask 1011 for the current image 1003.

FIG. 13 is a diagram illustrating an example of a system for implementing certain aspects of the present technology. In particular, FIG. 13 illustrates an example of computing system 1300, which may be for example any computing device making up internal computing system, a remote computing system, a camera, or any component thereof in which the components of the system are in communication with each other using connection 1305. Connection 1305 may be a physical connection using a bus, or a direct connection into processor 1310, such as in a chipset architecture. Connection 1305 may also be a virtual connection, networked connection, or logical connection.

In some aspects, computing system 1300 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1300 includes at least one processing unit (CPU or processor) 1310 and connection 1305 that communicatively couples various system components including system memory 1315, such as read-only memory (ROM) 1320 and random access memory (RAM) 1325 to processor 1310. Computing system 1300 may include a cache 1312 of high-speed memory connected directly with, in close proximity to, or integrated as part of processor 1310.

Processor 1310 may include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which may represent any number of input mechanisms, such as a microphone for speech, a touch-sensitive screen for gesture or graphical input, keyboard, mouse, motion input, speech, etc. Computing system 1300 may also include output device 1335, which may be one or more of a number of output mechanisms. In some instances, multimodal systems may enable a user to provide multiple types of input/output to communicate with computing system 1300.

Computing system 1300 may include communications interface 1340, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1330 may include software services, servers, services, etc., that when the code that defines such software is executed by the processor 1310, it causes the system to perform a function. In some aspects, a hardware service that performs a particular function may include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects or examples may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Illustrative aspects of the disclosure include:

Aspect 1. A processor-implemented method of generating one or more segmentation masks, the processor-implemented method comprising: generate a delta image based on a difference between a current image and a prior image; processing, using a transform operation, the delta image and features representing the prior image to generate a transformed feature representation of the prior image; combining the transformed feature representation of the prior image with features representing the current image to generate a combined feature representation of the current image; and generating, based on the combined feature representation of the current image, a segmentation mask for the current image.

Aspect 2. The processor-implemented method of Aspect 1, further comprising: processing, using a machine learning model, the prior image to generate the features representing the prior image.

Aspect 3. The processor-implemented method of Aspect 2, further comprising: processing, using the machine learning model, the current image to generate the features representing the current image.

Aspect 4. The processor-implemented method of any one of Aspects 2 or 3, wherein generating the delta image based on the difference between the current image and the prior image comprises: processing, using the machine learning model, the prior image to generate intermediate features representing the prior image; processing, using the machine learning model, the current image to generate intermediate features representing the current image; determining a difference between the intermediate features representing the prior image and the intermediate features representing the current image; and generate the delta image based on the difference between the intermediate features representing the prior image and the intermediate features representing the current image.

Aspect 5. The processor-implemented method of any one of Aspects 1 to 4, further comprising: combining the delta image with the features representing the prior image to generate a combined feature representation of the prior image.

Aspect 6. The processor-implemented method of Aspect 5, wherein processing, using the transform operation, the delta image and the features representing the prior image to generate the transformed feature representation of the prior image comprises: processing, using the transform operation, the combined feature representation of the prior image to generate the transformed feature representation of the prior image.

Aspect 7. The processor-implemented method of any one of Aspects 1 to 6, wherein the transform operation includes a convolutional operation performed using at least one convolutional filter.

Aspect 8. The processor-implemented method of Aspect 7, wherein weights of the at least one convolutional filter are fixed.

Aspect 9. The processor-implemented method of Aspect 7, wherein weights of the at least one convolutional filter are modified based on the delta image.

Aspect 10. The processor-implemented method of any one of Aspects 7 to 9, wherein the at least one convolutional filter includes a deformable convolution.

Aspect 11. The processor-implemented method of Aspect 10, wherein at least one weight offset of the deformable convolution is modified based on the delta image.

Aspect 12. The processor-implemented method of any one of Aspects 1 to 6, wherein the transform operation includes a transformer operation performed using at least one transformer block.

Aspect 13. An apparatus for generating one or more segmentation masks, the apparatus comprising: at least one memory; and at least one processor coupled to the at least one memory and configured to: generate a delta image based on a difference between a current image and a prior image; process, using a transform operation, the delta image and features representing the prior image to generate a transformed feature representation of the prior image; combine the transformed feature representation of the prior image with features representing the current image to generate a combined feature representation of the current image; and generate, based on the combined feature representation of the current image, a segmentation mask for the current image.

Aspect 14. The apparatus of Aspect 13, wherein the at least one processor is configured to: process, using a machine learning model, the prior image to generate the features representing the prior image.

Aspect 15. The apparatus of Aspect 14, wherein the at least one processor is configured to: process, using the machine learning model, the current image to generate the features representing the current image.

Aspect 16. The apparatus of any one of Aspects 14 or 15, wherein, to generate the delta image based on the difference between the current image and the prior image, the at least one processor is configured to: process, using the machine learning model, the prior image to generate intermediate features representing the prior image; process, using the machine learning model, the current image to generate intermediate features representing the current image; determine a difference between the intermediate features representing the prior image and the intermediate features representing the current image; and generate the delta image based on the difference between the intermediate features representing the prior image and the intermediate features representing the current image.

Aspect 17. The apparatus of any one of Aspects 13 to 16, wherein the at least one processor is configured to: combine the delta image with the features representing the prior image to generate a combined feature representation of the prior image.

Aspect 18. The apparatus of Aspect 17, wherein, to process the delta image and the features representing the prior image to generate the transformed feature representation of the prior image, the at least one processor is configured to: process, using the transform operation, the combined feature representation of the prior image to generate the transformed feature representation of the prior image.

Aspect 19. The apparatus of any one of Aspects 13 to 18, wherein the transform operation includes a convolutional operation performed using at least one convolutional filter.

Aspect 20. The apparatus of Aspect 19, wherein weights of the at least one convolutional filter are fixed.

Aspect 21. The apparatus of Aspect 19, wherein weights of the at least one convolutional filter are modified based on the delta image.

Aspect 22. The apparatus of any one of Aspects 19 to 21, wherein the at least one convolutional filter includes a deformable convolution.

Aspect 23. The apparatus of Aspect 22, wherein at least one weight offset of the deformable convolution is modified based on the delta image.

Aspect 24. The apparatus of any one of Aspects 13 to 18, wherein the transform operation includes a transformer operation performed using at least one transformer block.

Aspect 25. A non-transitory computer-readable medium having stored thereon instructions that, when executed by one or more processors, cause the one or more processors to perform operations according to any of Aspects 1 to 24.

Aspect 26. An apparatus comprising one or more means for performing operations according to any of Aspects 1 to 24.

What is claimed is:

1. A processor-implemented method of generating one or more segmentation masks, the processor-implemented method comprising:

generating, using a machine learning system, a delta image based on a difference between first pixels associated with a current image and second pixels associated with a prior image at a plurality of spatial locations;

combining the delta image with features in a first feature map generated by a machine learning model of the machine learning system from the prior image to generate a combined feature representation of the prior image;

processing, using a transform operation, the combined feature representation to generate a transformed feature representation of the prior image, wherein the transformed feature representation of the prior image aligns a first feature of an object of the prior image with a second feature of the object of the current image;

combining the transformed feature representation of the prior image with features in a second feature map generated by the machine learning model from the current image to generate a combined feature representation of the current image; and generating, using the machine learning system, based on the combined feature representation of the current image, a segmentation mask for the current image, wherein the segmentation mask identifies pixels of the current image that correspond to one or more objects presented in the current image.

2. The processor-implemented method of claim 1, further comprising:

processing, using the machine learning model of the machine learning system, the prior image to generate the features representing the prior image.

3. The processor-implemented method of claim 2, further comprising:

processing, using the machine learning model, the current image to generate the features representing the current image.

4. The processor-implemented method of claim 2, wherein generating the delta image based on the difference between the current image and the prior image comprises:

processing, using the machine learning model, the prior image to generate intermediate features representing the prior image;

processing, using the machine learning model, the current image to generate intermediate features representing the current image;

determining a difference between the intermediate features representing the prior image and the intermediate features representing the current image; and generating the delta image based on the difference between the intermediate features representing the prior image and the intermediate features representing the current image.

5. The processor-implemented method of claim 1, wherein the transform operation includes a convolutional operation performed using at least one convolutional filter.

6. The processor-implemented method of claim 5, wherein weights of the at least one convolutional filter are fixed.

7. The processor-implemented method of claim 5, wherein weights of the at least one convolutional filter are modified based on the delta image.

8. The processor-implemented method of claim 5, wherein the at least one convolutional filter includes a deformable convolution.

9. The processor-implemented method of claim 8, wherein at least one weight offset of the deformable convolution is modified based on the delta image.

10. The processor-implemented method of claim 1, wherein the transform operation includes a transformer operation performed using at least one transformer block.

11. The processor-implemented method of claim 1, wherein combining the delta image with the features representing the prior image comprises concatenating the delta image and the features representing the prior image.

12. The processor-implemented method of claim 1, wherein combining the transformed feature representation of the prior image with the features representing the current image comprises concatenating the transformed feature representation of the prior image and the features representing the current image.

13. An apparatus for generating one or more segmentation masks, the apparatus comprising:

at least one memory; and at least one processor coupled to the at least one memory and configured to:

generate, using a machine learning system, a delta image based on a difference between first pixels associated with a current image and second pixels associated with a prior image at a plurality of spatial locations;

combine the delta image with features in a first feature map generated by a machine learning model of the machine learning system representing the prior image to generate a combined feature representation of the prior image;

process, using a transform operation, the combined feature representation to generate a transformed feature representation of the prior image, wherein the transformed feature representation of the prior image aligns a first feature of an object of the prior image with a second feature of the object of the current image;

combine the transformed feature representation of the prior image with features in a second feature map generated by the machine learning model from the current image to generate a combined feature representation of the current image; and generate, using the machine learning system, based on the combined feature representation of the current image, a segmentation mask for the current image, wherein the segmentation mask identifies pixels of the current image that correspond to one or more objects present in the current image.

14. The apparatus of claim 13, wherein the at least one processor is configured to:

process, using the machine learning model of the machine learning system, the prior image to generate the features representing the prior image.

15. The apparatus of claim 14, wherein the at least one processor is configured to:

process, using the machine learning model, the current image to generate the features representing the current image.

16. The apparatus of claim 14, wherein, to generate the delta image based on the difference between the current image and the prior image, the at least one processor is configured to:

process, using the machine learning model, the prior image to generate intermediate features representing the prior image;

process, using the machine learning model, the current image to generate intermediate features representing the current image;

determine a difference between the intermediate features representing the prior image and the intermediate features representing the current image; and generate the delta image based on the difference between the intermediate features representing the prior image and the intermediate features representing the current image.

17. The apparatus of claim 13, wherein the transform operation includes a convolutional operation performed using at least one convolutional filter.

18. The apparatus of claim 17, wherein weights of the at least one convolutional filter are fixed.

19. The apparatus of claim 17, wherein weights of the at least one convolutional filter are modified based on the delta image.

20. The apparatus of claim 17, wherein the at least one convolutional filter includes a deformable convolution.

21. The apparatus of claim 20, wherein at least one weight offset of the deformable convolution is modified based on the delta image.

22. The apparatus of claim 13, wherein the transform operation includes a transformer operation performed using at least one transformer block.

23. The apparatus of claim 13, wherein, to combine the delta image with the features representing the prior image, the at least one processor is configured to concatenate the delta image and the features representing the prior image.

24. The apparatus of claim 13, wherein, to combine the transformed feature representation of the prior image with the features representing the current image, the at least one processor is configured to concatenate the transformed feature representation of the prior image and the features representing the current image.

25. A non-transitory computer-readable medium having stored thereon instructions that, when executed by one or more processors, cause the one or more processors to:

generate, via a machine learning system, a delta image based on a difference between first pixels associated with a current image and second pixels associated with a prior image at a plurality of spatial locations;

combine the delta image with features in a first feature map generated by a machine learning model of the machine learning system from the prior image to generate a combined feature representation of the prior image;

process, using a transform operation, the combined feature representation to generate a transformed feature representation of the prior image, wherein the transformed feature representation of the prior image aligns a first feature of an object of the prior image with a second feature of the object of the current image;

combine the transformed feature representation of the prior image with features in a second feature map generated by the machine learning model from the current image to generate a combined feature representation of the current image; and generate, using the machine learning model and based on the combined feature representation of the current image, a segmentation mask for the current image, wherein the segmentation mask identifies pixels of the current image that correspond to one or more objects presented in the current image.

26. The non-transitory computer-readable medium of claim 25, wherein the instructions, when executed by the one or more processors, cause the one or more processors to:

process, using the machine learning model, the prior image to generate the features representing the prior image; and process, using the machine learning model, the current image to generate the features representing the current image.

27. The non-transitory computer-readable medium of claim 26, wherein, to generate the delta image based on the difference between the current image and the prior image, the instructions, when executed by the one or more processors, cause the one or more processors to:

process, using the machine learning model, the prior image to generate intermediate features representing the prior image;

process, using the machine learning model, the current image to generate intermediate features representing the current image;

determine a difference between the intermediate features representing the prior image and the intermediate features representing the current image; and generate the delta image based on the difference between the intermediate features representing the prior image and the intermediate features representing the current image.

28. The non-transitory computer-readable medium of claim 25, wherein the transform operation includes a convolutional operation performed using at least one convolutional filter.

29. The non-transitory computer-readable medium of claim 28, wherein weights of the at least one convolutional filter are fixed.

30. The non-transitory computer-readable medium of claim 28, wherein, to combine the delta image with the features representing the prior image, the instructions, when executed by the one or more processors, cause the one or more processors to concatenate the delta image and the features representing the prior image.

* * * * *